United States Patent
Ohara et al.

(10) Patent No.: US 9,992,329 B2
(45) Date of Patent: Jun. 5, 2018

(54) COMMUNICATION APPARATUS, CONTROL METHOD FOR COMMUNICATION APPARATUS, AND STORAGE MEDIUM

(71) Applicant: CANON KABUSHIKI KAISHA, Tokyo (JP)

(72) Inventors: Eiji Ohara, Kashiwa (JP); Hiroshi Fukada, Kashiwa (JP)

(73) Assignee: Canon Kabushiki Kaisha, Tokyo (JP)

( * ) Notice: Subject to any disclaimer, the term of this patent is extended or adjusted under 35 U.S.C. 154(b) by 0 days. days.

(21) Appl. No.: 15/265,689

(22) Filed: Sep. 14, 2016

(65) Prior Publication Data

US 2017/0085703 A1   Mar. 23, 2017

(30) Foreign Application Priority Data

Sep. 18, 2015 (JP) .................................. 2015-184786

(51) Int. Cl.
| | | |
|---|---|---|
| *H04M 11/00* | (2006.01) | |
| *H04M 1/82* | (2006.01) | |
| *H04M 1/24* | (2006.01) | |

(52) U.S. Cl.
CPC .............. *H04M 1/82* (2013.01); *H04M 1/24* (2013.01)

(58) Field of Classification Search
USPC ......................................... 379/100.01, 93.01
See application file for complete search history.

(56) References Cited

U.S. PATENT DOCUMENTS

| | | | | | |
|---|---|---|---|---|---|
| 2006/0233329 | A1* | 10/2006 | Ito | ........................ | H04M 11/066 379/100.01 |
| 2007/0041543 | A1* | 2/2007 | Kabeya | .............. | H04N 1/32765 379/157 |
| 2008/0187129 | A1* | 8/2008 | Lu | .......................... | H04B 3/237 379/406.06 |
| 2010/0189234 | A1* | 7/2010 | Nakazawa | ........... | H04M 11/066 379/100.01 |
| 2015/0281419 | A1* | 10/2015 | Fukushima | ............. | H04M 1/24 379/2 |

FOREIGN PATENT DOCUMENTS

| | | |
|---|---|---|
| JP | 2012-049827 A | 3/2012 |
| JP | 2012-249196 A | 12/2012 |

* cited by examiner

*Primary Examiner* — Quoc D Tran
(74) *Attorney, Agent, or Firm* — Canon U.S.A., Inc. IP Division

(57) ABSTRACT

A communication apparatus, which captures a line in response to an off-hook operation, includes a first adjustment unit, a detection unit, and a second adjustment unit. The first adjustment unit performs first impedance adjustment according to detection of the off-hook operation. The detection unit detects a line current and a dial tone signal. The second adjustment unit performs second impedance adjustment based on the line current according to a result of detection of the dial tone signal by the detection unit after the first impedance adjustment is performed by the first adjustment unit.

19 Claims, 16 Drawing Sheets

$V = 48 - Z0 \times I$

COMMUNICATION APPARATUS, CONTROL METHOD FOR COMMUNICATION APPARATUS, AND STORAGE MEDIUM

BACKGROUND OF THE INVENTION

Field of the Invention

Aspects of the present invention generally relate to a communication apparatus, a control method for a communication apparatus, and a storage medium.

Description of the Related Art

Most of facsimile apparatuses are supposed to be directly connected to a public line network (for example, the public switched telephone network (PSTN)). Therefore, facsimile apparatuses are tightly managed in such a way as to conform to predetermined technical standards of the PSTN.

On the other hand, due to the development of information and communication equipment, communication apparatuses that perform sending and receiving of voice data using Voice over Internet Protocol (VoIP) technologies with the use of Internet Protocol (IP) networks having broadband transmission channels, such as Digital Subscriber Line (DSL) and fiber-optic communication lines, are in widespread use.

For example, in a case where a telephone set connected to a facsimile apparatus adapted to the PSTN is used to perform voice communication with the use of VoIP technologies, a voice signal output from the facsimile apparatus needs to be converted into a signal of the format conforming to the IP network. Therefore, the facsimile apparatus is connected to the IP network via, for example, a VoIP adapter, which functions as an interface for such signal conversion. The VoIP adapter, which is connected to such a facsimile apparatus, is usually called a "terminal adapter", and includes known apparatuses of various communication formats, such as a business phone system. The main equipment of a recent business phone system is equipped with an interface used for connection of a telephone set or facsimile apparatus adapted to the PSTN, and functions as the above-mentioned terminal adapter.

Such terminal adapters, which are not directly connected to the PSTN, are, therefore, not required to meet the predetermined technical standards needed to connect to the PSTN, and are often structured according to unique specifications, such as that described below, convenient for the respective terminal adapters.

For example, the telephone exchange installed on a line is required to send out a call indicator (CI) signal and, when detecting the off-hook state of a facsimile apparatus, to stop sending out the CI signal. However, in recent years, terminal adapters that do not immediately stop sending of the CI signal have appeared in the market.

Furthermore, while facsimile apparatuses perform adjustment to have a predetermined load impedance when going off-hook, the telephone exchange installed on a line is required to supply an off-hook current corresponding to the predetermined load impedance. However, in recent years, terminal adapters of the constant-current operation type that perform limitation in such a way as to be able to supply only a constant current for the purpose of reducing operating power have appeared in the market. While the terminal adapters of the constant-current operation type are the ones configured to limit off-hook current to a minimum for the purpose of enabling battery-powered operation, the predetermined technical standards, which are essentially needed to connect to the PSTN, do not have such specified limitation.

A facsimile apparatus connected to such a terminal adapter of the constant-current operation type is configured to perform impedance adjustment when going off-hook in such a way as to obtain a constant off-hook current to which the terminal adapter limits the off-hook current. Moreover, in the above-mentioned constant-current operation type, a current difference between an off-hook current available for operation of the terminal adapter and an off-hook current insufficient for operation thereof is small. This means that the range of off-hook currents available for operation of the terminal adapter of the constant-current operation type is narrow. Thus, as a result, a facsimile apparatus connected to such a terminal adapter of the constant-current operation type needs to perform impedance adjustment in such a way as to cause the off-hook current to fall within the narrow off-hook current range.

Furthermore, as an extreme example, in a case where an off-hook current supplied from the terminal adapter is not sufficient for a load impedance for off-hook of a facsimile apparatus, the terminal adapter may sometimes not recognize a line closed state. In such a case, even when the facsimile apparatus detects a CI signal output from the terminal adapter and performs an off-hook operation, the terminal adapter would endlessly continue outputting the CI signal.

FIG. 16 is a timing chart illustrating a condition in a case where the terminal adapter does not recognize a line closed state during setting of facsimile automatic reception.

For example, in the PSTN in Japan, the line voltage during a line open state is DC 48 volts (V), the CI signal is a repetitive pattern (hereinafter referred to as a "cadence") in which an alternating-current signal with a frequency of 16 hertz (Hz) and a voltage of 75 volts root mean square (Vrms) is alternately in an on-state for one second and in an off-state for two seconds. Here, the line condition of the facsimile apparatus during a line open state is assumed to be the same as in the PSTN.

The facsimile apparatus, when waiting in the automatic reception mode, performs an off-hook operation in response to an off-state of the CI signal, which is output from the terminal adapter, after the on-state of the CI signal is detected two times. When the facsimile apparatus performs the off-hook operation, the input impedance thereof lowers, a line current supplied from the terminal adapter flows through the facsimile apparatus, and the line voltage decreases according to the amount of the flowing line current. However, since the flowing line current is not a line current sufficient for the terminal adapter to recognize a line closed state, the terminal adapter would endlessly continue outputting the CI signal until the sending source terminates communication.

Japanese Patent Application Laid-Open No. 2012-249196 and Japanese Patent Application Laid-Open No. 2012-49827 discuss a technique in a conventional facsimile apparatus to protect circuits of the facsimile apparatus from a CI signal (a residual CI signal) that is belatedly output from the line side during a line closed state.

As mentioned above, a facsimile apparatus connected to a terminal adapter of the constant-current operation type is configured to perform impedance adjustment when going off-hook while being limited by a constant off-hook current predetermined by the terminal adapter. However, a conventional facsimile apparatus is not configured to perform impedance adjustment in consideration of such characteristics of the terminal adapter as to supply a constant off-hook current as mentioned above. While the off-hook current becomes almost equal to a current value subjected to the current limitation, the conventional facsimile apparatus is not able to determine whether the off-hook current has become a current value required for the terminal adapter to operate, in other words, whether the impedance has been adjusted to a sufficient small value. Thus, despite a constant off-hook current being supplied to the facsimile apparatus, an off-hook current required for the constant-current characteristics of the terminal adapter may sometimes not be reached, so that, in actuality, the terminal adapter may not operate.

Furthermore, the technique discussed in Japanese Patent Application Laid-Open No. 2012-249196 and Japanese Patent Application Laid-Open No. 2012-49827 is premised on that the line side normally recognizes a line closed state in response to an off-hook operation of the facsimile apparatus, and thus does not take into consideration a case where, even when the facsimile apparatus performs an off-hook operation, the line side does not recognize a line closed state. Therefore, when the line side (terminal adapter side) does not recognize a line closed state during setting of facsimile automatic reception, the conventional facsimile apparatus may be unable to perform a reception operation. Moreover, in some cases, the CI signal continuing being endlessly received may damage circuits of the facsimile apparatus.

SUMMARY OF THE INVENTION

According to an aspect of the present invention, a communication apparatus that captures a line in response to an off-hook operation includes a first adjustment unit configured to perform first impedance adjustment according to detection of the off-hook operation, a detection unit configured to detect a line current and a dial tone signal, and a second adjustment unit configured to perform second impedance adjustment based on the line current according to a result of detection of the dial tone signal by the detection unit after the first impedance adjustment is performed by the first adjustment unit.

To prevent the occurrence of such a situation as to be unable to go off-hook even during connection to a terminal adapter having a constant current characteristic for supplying a constant off-hook current, a control method for a communication apparatus that captures a line in response to an off-hook operation includes performing first impedance adjustment according to detection of the off-hook operation, detecting a line current and a dial tone signal, and performing second impedance adjustment based on the line current according to a result of detection of the dial tone signal after the first impedance adjustment is performed. Further features of the present invention will become apparent from the following description of exemplary embodiments with reference to the attached drawings.

DESCRIPTION OF THE EMBODIMENTS

Various exemplary embodiments, features, and aspects of the invention will be described in detail below with reference to the drawings.

Figure 1:
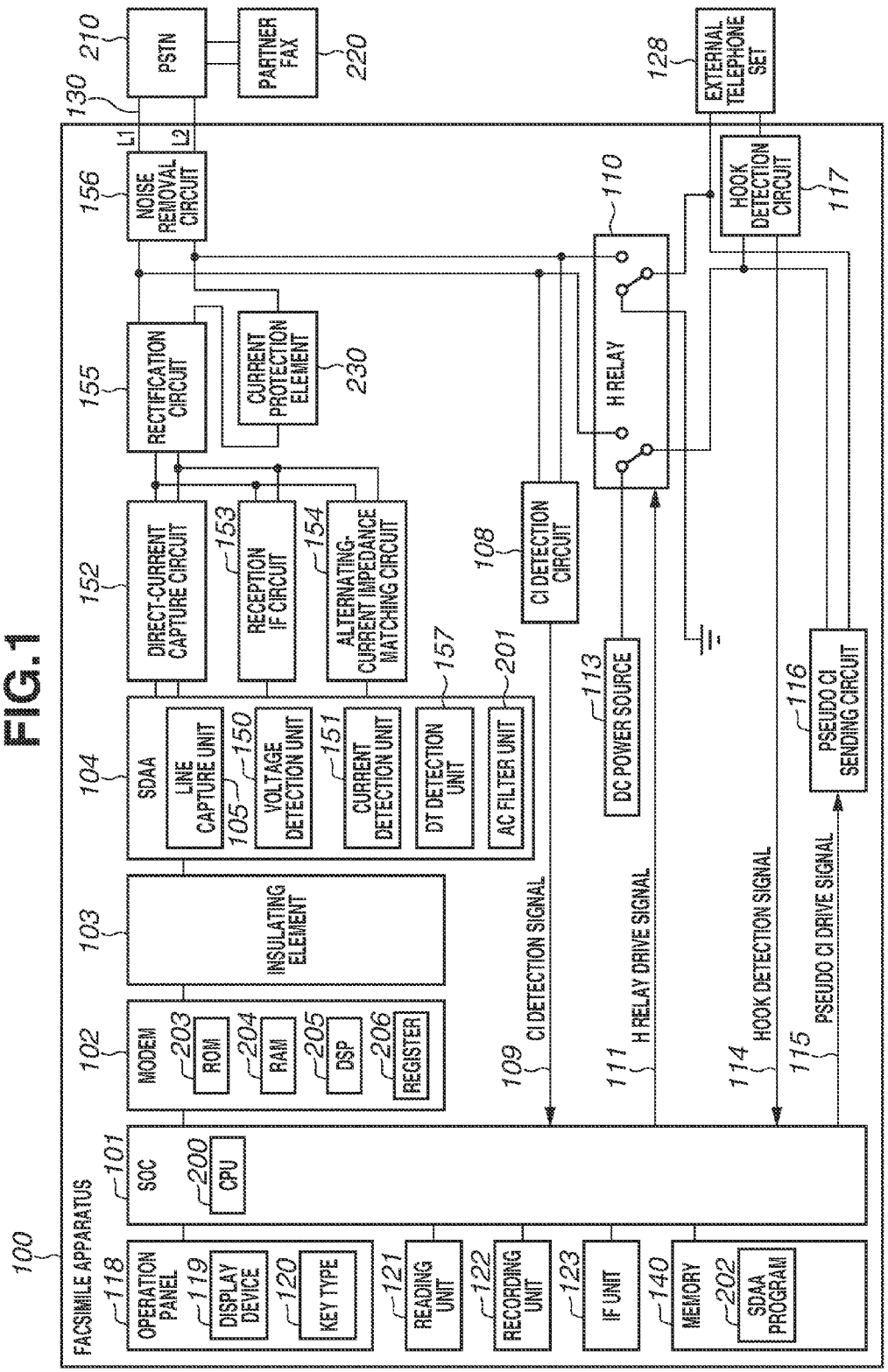
FIG. 1 illustrates an example of a configuration of a facsimile apparatus serving as a communication apparatus according to an exemplary embodiment of the present invention.

FIG. 1 illustrates an example of a configuration of a facsimile apparatus serving as a communication apparatus according to an exemplary embodiment of the present invention.

First, outlines of a first exemplary embodiment and a second exemplary embodiment are described.

With the facsimile apparatus 100 illustrated in FIG. 1, for example, to perform facsimile (FAX) transmission or line capture (line seizure), the user can press a FAX transmission key or an off-hook key displayed on an operation panel 118, thus starting off-hook from on-hook. In response to this, the facsimile apparatus 100 performs an off-hook operation. At this time, the facsimile apparatus 100 detects a line current and a line signal obtained after first direct-current impedance adjustment performed in the process of the off-hook operation, and checks a line state based on a result of the detection. The facsimile apparatus 100 performs predetermined second direct-current impedance adjustment corresponding to the line current based on a result of checking of the line state, details of which are described below. Furthermore, the terms "on-hook" and "off-hook" refer to the states in which the facsimile apparatus 100 is in an on-hook status and in an off-hook status, respectively. The term "off-hook operation" refers to a series of processing operations performed from when off-hook is started until when direct-current impedance adjustment is performed.

In the first exemplary embodiment, when checking the line state as mentioned above, the facsimile apparatus 100 detects a line current during off-hook and further detects a dial tone signal, which is a line signal. If, as a result of checking of the line state, although a predetermined current has been detected, a possible dial tone signal has not been detected, the facsimile apparatus 100 performs second direct-current impedance adjustment.

Furthermore, in the second exemplary embodiment, when checking the line state as mentioned above, the facsimile apparatus 100 detects a line current during off-hook and further detects a communication signal, which is a line signal. If, as a result of checking of the line state, although a predetermined current has been detected, a possible communication signal has not been detected, the facsimile apparatus 100 performs second direct-current impedance adjustment.

A block configuration of the communication apparatus (here, a facsimile apparatus being used as an example) 100 according to an exemplary embodiment is described below with reference to FIG. 1.

In the facsimile apparatus 100, a system on chip (SOC) 101 controls the entire system of the facsimile apparatus 100. A central processing unit (CPU) for the facsimile apparatus 100 is mounted as a CPU 200 on the SOC 101.

A memory 140 connected to the SOC 101 is a main storage device, and functions as a system work memory for the CPU 200 of the SOC 101 and a memory storing a control program executed for performing processing according to an exemplary embodiment. Moreover, the memory 140 also functions as a memory for temporarily storing image data and various pieces of information at the time of facsimile transmission or facsimile reception. Additionally, the memory 140 stores information set by the user.

An SDAA program 202 is a program that is executed by a digital signal processor (DSP) 205 after being transferred to a modem 102 via the SOC 101 and loaded onto a random access memory (RAM) 204.

An operation panel 118, a reading unit 121, a recording unit 122, and an interface (IF) unit 123 are connected to the SOC 101. The operation panel 118 includes a display device 119 and a keyboard (KEY) type 120, which function as a user interface. The display device 119 displays the status of the apparatus or menus thereof. Moreover, the keyboard type 120 is a keyboard, such as buttons or a numeric keypad, for receiving inputting of various instructions from the user. The user can input user setting information using the keyboard type 120.

The reading unit 121 reads an image from an original to generate image data. The generated image data can be transmitted to a communication partner apparatus via a communication line 130, or can be printed by the recording unit 122.

The interface unit 123 functions as an interface used in a case where various types of information equipment are externally connected.

The modem 102, which is connected to the SOC 101, is a modulator-demodulator which operates under the control of the SOC 101. The modem 102 performs modulation processing using image data generated by the reading operation of the reading unit 121, which is an object of facsimile transmission, and demodulation processing on a signal received via the communication line 130. The modem 102 is connected to a silicon data access arrangement (SDAA) 104 via an insulating element 103.

In the modem 102, a read-only memory (ROM) 203 stores a program, which is to be loaded onto the RAM 204 and executed by the DSP 205. The SDAA program 202 transferred from a host, i.e., the SOC 101, and the content of the ROM 203 are loaded onto the RAM 204 and are then executed by the DSP 205. The DSP 205 performs the operation of the modem 102 based on the content of the RAM 204. A register 206 stores the state of the SDAA 104 or stores an instruction from the SOC 101.

The SDAA 104, which is an example of a network control device, is a semiconductor network control unit (NCU). The SDAA 104, which is connected to the communication line 130 via a direct-current capture circuit 152 and other circuits, functions as an interface between the facsimile apparatus 100 and the external public line (communication line) 130 or a terminal adapter, which is described below with reference to FIG. 2. Moreover, the SDAA 104 controls the connection (capture) state of the line when performing communication with a communication partner apparatus via the communication line 130.

A telephone set 128 externally mounted on the facsimile apparatus 100 is also connected to the communication line 130. The telephone set 128 is connected to the communication line 130 via an H relay 110, and the SDAA 104 is connected to the communication line 130 in parallel with the telephone set 128. The SDAA 104 not only captures (seizes) the line and controls communication performed via the line when performing facsimile transmission and reception, but also controls the capture state of the line when the telephone set 128 performs voice communication with a communication partner apparatus via the communication line 130. The SDAA 104 performs such control operations under the control of the SOC 101.

The SDAA 104 controls a direct-current capture state of the line using a line capture unit 105. The direct-current impedance obtained when the line is direct-current captured by the line capture unit 105 is variable. The direct-current impedance is obtained by being controlled by a predetermined current characteristic with respect to a direct-current-like voltage (hereinafter referred to as a "DC-VI characteristic").

A voltage detection unit 150 is a unit that monitors a voltage on the line. A current detection unit 151 is a unit that monitors a current on the line. A DT detection unit 157 is a unit that monitors a dial tone signal on the line. An AC filter unit 201 is connected to the anterior stage of the voltage detection unit 150 or the current detection unit 151, and is configured to prevent any false detection caused by an alternating-current (AC) component when the voltage detection unit 150 or the current detection unit 151 detects a direct-current (DC) voltage or a current.

The direct-current capture circuit 152 is a peripheral circuit of the SDAA 104, which is composed of a current source such as a transistor, and is a circuit that functions to, while performing direct-current capture by adjusting a current of the current source, adjust the direct-current impedance under the control of the SDAA 104. The direct-current capture circuit 152 is also used to create a line open state or to send out a dial pulse, which is a type of selection signal for the line.

A rectification circuit 155 is composed of, for example, a diode bridge, and is configured to rectify a signal from the line and transmit the rectified signal to the SDAA 104. A reception IF circuit 153 is an interface circuit configured to receive, for example, a facsimile reception signal, which is received via the communication line 130. An alternating-current impedance matching circuit 154 is a circuit configured to match alternating-current impedances during communication. For example, in Japan, the alternating-current impedance matching circuit 154 matches the alternating-current impedance to 600 ohms.

A noise removal circuit 156 is a circuit that prevents, for example, lightning surge and electromagnetic noise transferred from the communication line 130 and, conversely, prevents noise of the facsimile apparatus 100 from being sent out via the communication line 130.

A CI detection circuit 108 is connected to the communication line 130 and is configured to detect a call signal received from the communication line 130 (hereinafter referred to as a "CI signal"). When detecting the CI signal from the communication line 130, the CI detection circuit 108 sends a CI detection signal 109, which indicates detection of the CI signal, to the SOC 101. The SOC 101 is able to determine whether the CI signal has been received from the communication line 130, based on the CI detection signal 109.

The H relay 110 is a circuit configured to connect the external telephone set 128, which is connected via a hook detection circuit 117, to a DC power source 113 or the communication line 130. The H relay 110 is an example of a unit configured to switch between a connection state of connecting the external telephone set 128 to the communication line 130 and a disconnection state of disconnecting the external telephone set 128 from the communication line 130. Moreover, the H relay 110 is controlled by the SOC 101 via an H relay drive signal 111. Additionally, in a case where the telephone set 128 is disconnected from the PSTN line 130 by the H relay 110 as illustrated in FIG. 1, even when the CI signal has been received, the telephone set 128 does not ring. In this case, the facsimile apparatus 100 enters what is called a non-ringing reception state.

The DC power source 113 is a circuit that supplies current to the hook detection circuit 117. The hook detection circuit 117, which is connected to the telephone set 128, is an example of a circuit that detects off-hook or on-hook of the telephone set 128. The hook detection circuit 117 transmits a result of detection of off-hook or on-hook of the telephone set 128 to the SOC 101 via a hook detection signal 114. The SOC 101 is able to determine the state of hook of the telephone set 128 based on the hook detection signal 114. The hook detection circuit 117 detects a current flowing through the telephone set 128 in each of respective cases where the hook detection circuit 117 is directly connected to the communication line 130 and to the DC power source 113 by the H relay 110. With this, the hook detection circuit 117 detects the state of off-hook or on-hook of the telephone set 128.

A pseudo CI sending circuit 116 is a circuit that sends out a pseudo CI signal to the telephone set 128. The pseudo CI signal is a signal to be sent to the telephone set 128 so as to ring the telephone set 128, which is in a state of being disconnected from the line, in a case where a CI signal has been received from a communication partner apparatus via the communication line 130. The pseudo CI sending circuit 116 sends out the pseudo CI signal to the telephone set 128 according to a sending instruction in the form of a pseudo CI drive signal 115 from the SOC 101.

A public line network 210 is, for example, the PSTN. A communication partner FAX 220 is a facsimile apparatus that can be a communication partner of the facsimile apparatus 100. A current protection element 230 is composed of, for example, a fuse.

Figure 2:
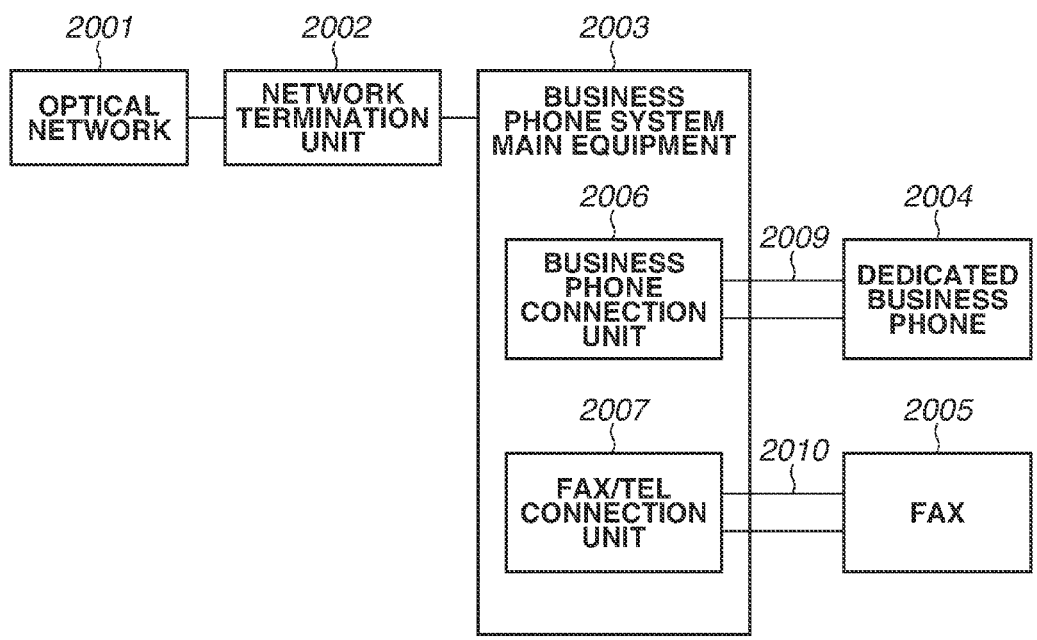
FIG. 2 illustrates a business phone system serving as an example of a terminal apparatus.

FIG. 2 illustrates a business phone system serving as an example of a terminal adapter (TA). The business phone system includes an optical network 2001, a network termination unit 2002, which is a unit configured to convert an optical signal into, for example, an electrical signal for a local area network (LAN), and main equipment 2003 of the business phone system.

The main equipment 2003 includes a connection unit 2006 used for connection of a dedicated business phone (a business phone connection unit). The business phone system further includes a dedicated business phone 2004 and a signal line 2009, which is used to connect the dedicated business phone 2004 and the connection unit 2006.

The main equipment 2003 further includes a connection unit 2007 used for connection of a facsimile apparatus or telephone set for the PSTN (a FAX/TEL connection unit). The business phone system further includes a facsimile apparatus (FAX) 2005 for the PSTN, which corresponds to, for example, the facsimile apparatus 100 illustrated in FIG. 1, and a signal line 2010 used to connect the FAX/TEL connection unit 2007 and the facsimile apparatus 2005.

While a current from the signal line 2010 is limited within the range of about 20 mA to 120 mA in the case of the technical standards of the PSTN, unique specifications, such as those described below, convenient for the terminal adapter may be often employed as mentioned above. Thus, the terminal adapter illustrated in FIG. 2 is a terminal adapter in which a limitation is imposed on a current for the purpose of reducing operating power and is a terminal adapter subjected to, for example, a current limitation with about 20 mA and capable of operating only with such a constant current.

Figure 3:
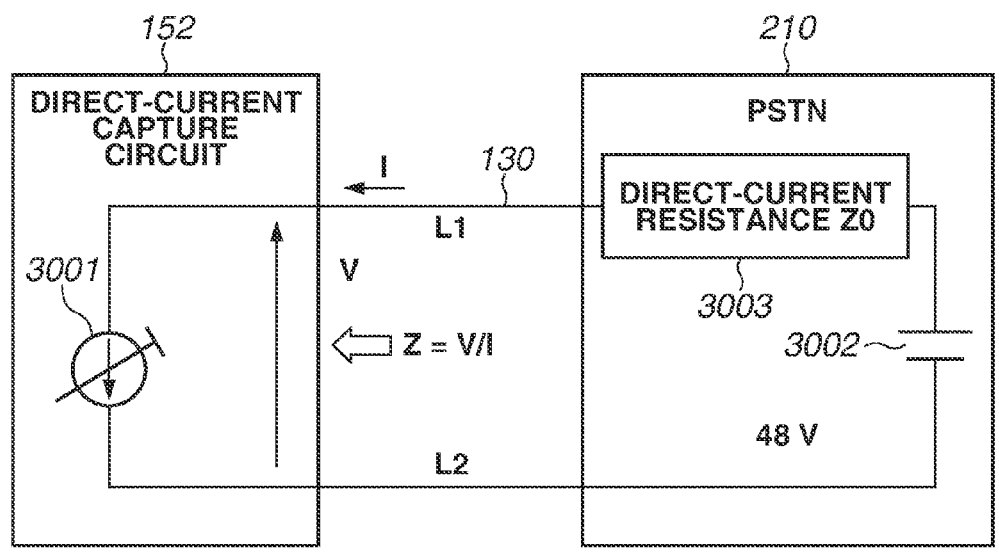
FIG. 3 illustrates an operation of a direct-current capture circuit during connection to the PSTN.

FIG. 3 illustrates an operation of the direct-current capture circuit 152 during connection to the PSTN.

The public line network (PSTN) 210 includes a voltage source 3002 of the station-side telephone exchange and a direct-current resistance 3003 inside the PSTN 210, and a direct-current voltage of 48 V is supplied to the direct-current capture circuit 152 via the direct-current resistance 3003 connected via the communication line 130.

The direct-current capture circuit 152 includes a current source 3001 capable of varying a current value, and adjusts a current value I supplied from the PSTN 210 under the control of the SDAA 104. The direct-current capture circuit 152 adjusts the current I in such a way as to match the characteristic of the current I with respect to a previously set direct-current-like voltage V, so that the direct-current impedance Z (V/I) of the direct-current capture circuit 152 can be adjusted. At this time, the voltage V becomes equal to a voltage obtained by subtracting "Z0×I", which is a voltage drop due to the direct-current resistance 3003, from 48 V of the voltage source 3002. Accordingly, the voltage V and the current I can be expressed by the relational expression "V=48−Z0×I".

Figure 4:
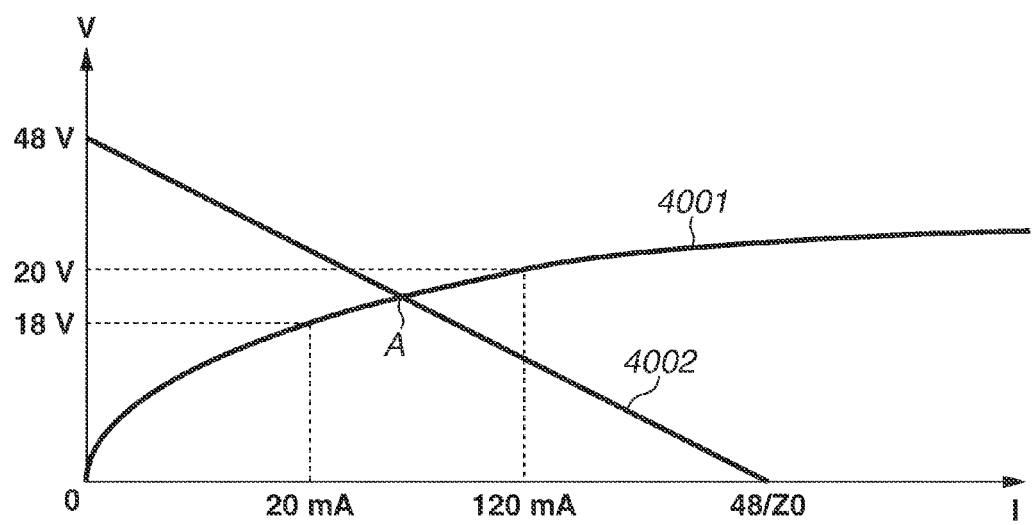
FIG. 4 illustrates a relationship between direct-current impedance adjustment and DC-VI characteristics by the direct-current capture circuit during connection to the PSTN.

FIG. 4 illustrates a relationship between direct-current impedance adjustment and DC-VI characteristics by the direct-current capture circuit 152 during connection to the PSTN. In each graph, the ordinate axis indicates a voltage value, and the abscissa axis indicate a current value.

In FIG. 4, a curve 4001 represents an example of a DC-VI characteristic curve indicating the direct-current voltage-current characteristic in the case of performing direct-current capture, which is selected, for example, to perform facsimile communication. Here is illustrated a DC-VI characteristic example in which the impedance becomes high when the line current is small and the impedance becomes low when the line current is large. For example, when the line current is at 20 mA, the direct-current resistance becomes apparently about 900Ω, and, when the line current is at 120 mA, the apparent direct-current resistance becomes about 167Ω.

A curve 4002 represents the relational expression "V=48−Z0×I" indicating the relationship between the voltage V and the current I when the direct-current impedance adjustment described with reference to FIG. 3 is performed. When the current I is at 0 A, the voltage V indicates 48 V, and when the current I is at 48/Z0 A, the voltage V indicates 0 V. For example, when the direct-current resistance 3003 is 200Ω, since the line current I is at about 240 mA, the voltage V indicates 0 V.

In this way, the current I is adjusted in such a way as to match the characteristic 4001 of the current I with respect to the previously set direct-current-like voltage V, and, furthermore, since the voltage V and the current I vary along the line 4002, the impedance Z is determined to converge on an intersection A between the curves 4001 and 4002.

Figure 5:
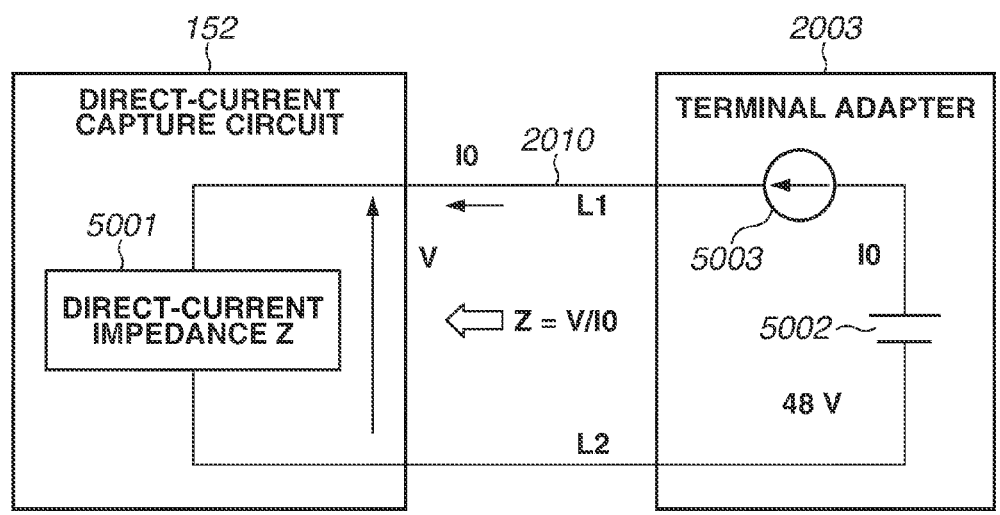
FIG. 5 illustrates an operation of the direct-current capture circuit during connection to the terminal adapter.

FIG. 5 illustrates an operation of the direct-current capture circuit 152 during connection to the terminal adapter.

The terminal adapter 2003 includes a voltage source 5002 of 48 V and a current source 5003, and supplies a previously set constant current I0 to the direct-current capture circuit 152 connected via a communication line 2010.

The direct-current capture circuit 152 includes a direct-current impedance Z 5001 capable of varying the direct-current impedance value, and adjusts the direct-current impedance according to the constant current value I0 supplied from the terminal adapter 2003 under the control of the SDAA 104. Adjusting the voltage V in such a way as to match the characteristic of the current I with respect to a previously set direct-current-like voltage V enables adjusting the direct-current impedance Z (V/I0) of the direct-current capture circuit 152. At this time, since the voltage V is generated by the constant current I0 of the constant current source 5003 flowing through the direct-current impedance Z 5001, the voltage V and the current I0 can be expressed by the relational expression "V=Z×I0".

Figure 6:
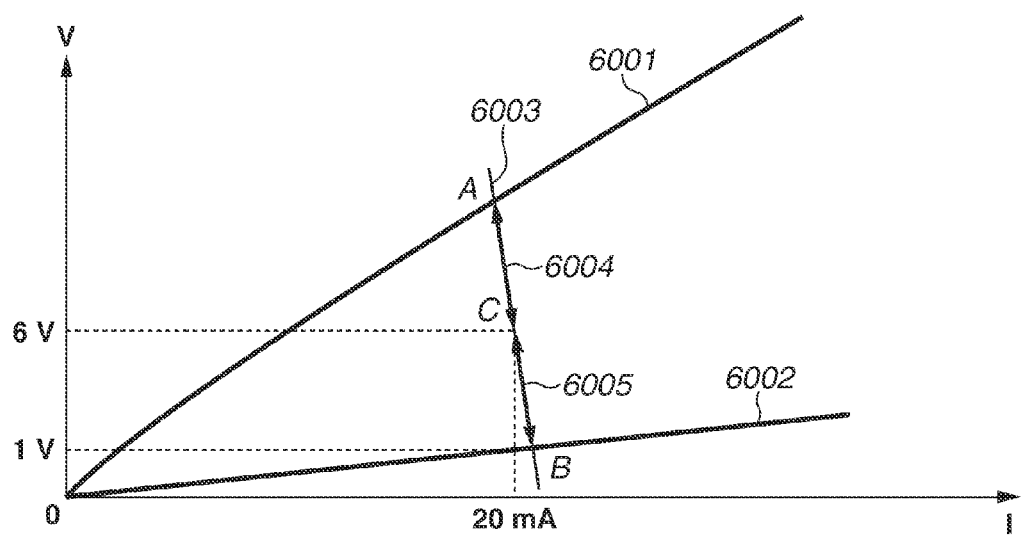
FIG. 6 illustrates a relationship between direct-current impedance adjustment and DC-VI characteristics by the direct-current capture circuit during connection to the terminal adapter.

FIG. 6 illustrates a relationship between direct-current impedance adjustment and DC-VI characteristics by the direct-current capture circuit 152 during connection to the terminal adapter. In each graph, the ordinate axis indicates a voltage value and the abscissa axis indicate a current value.

In FIG. 6, curves 6001 and 6002 respectively represent examples of DC-VI characteristic curves indicating the adjustment range including the upper limit and the lower limit of the direct-current voltage-current characteristic in the case of performing direct-current capture, which is selected, for example, to perform facsimile communication.

A straight line 6003 represents the relationship between the voltage V and the current I0 when the direct-current impedance adjustment described with reference to FIG. 5 is performed. While, ideally, the current I0 becomes a constant current value (in this example, 20 mA), as mentioned above, actually, the current I0 depends on the constant current characteristic of the terminal adapter and somewhat varies near at 20 mA according to the direct-current impedance Z as indicated by the straight line 6003.

The direct-current impedance adjustment is performed in such a way as to match the adjustment range including the upper limit 6001 and the lower limit 6002, which is the characteristic of the current I with respect to a previously set direct-current-like voltage V. Furthermore, since the voltage V and the current I vary along the straight line 6003 according to the characteristic of the terminal adapter, the impedance Z is determined to converge on values on a straight line connecting intersections A and B between the straight line 6003 and the curves 6001 and 6002.

Here, when the impedance Z is in a range 6005 on the straight line BC as a result of convergence of direct-current impedance adjustment, a current value required for the terminal adapter to normally operate is obtained. Thus, in this example, a direct-current impedance sufficiently smaller than 300Ω is obtained.

However, when the impedance Z is in a range 6004 on the straight line AC as a result of convergence of direct-current impedance adjustment, the case is where a current required for the constant current characteristic of the terminal adapter is lacking, so that, actually, impedance adjustment in which the terminal adapter is not normally operating has been performed.

Figure 7:
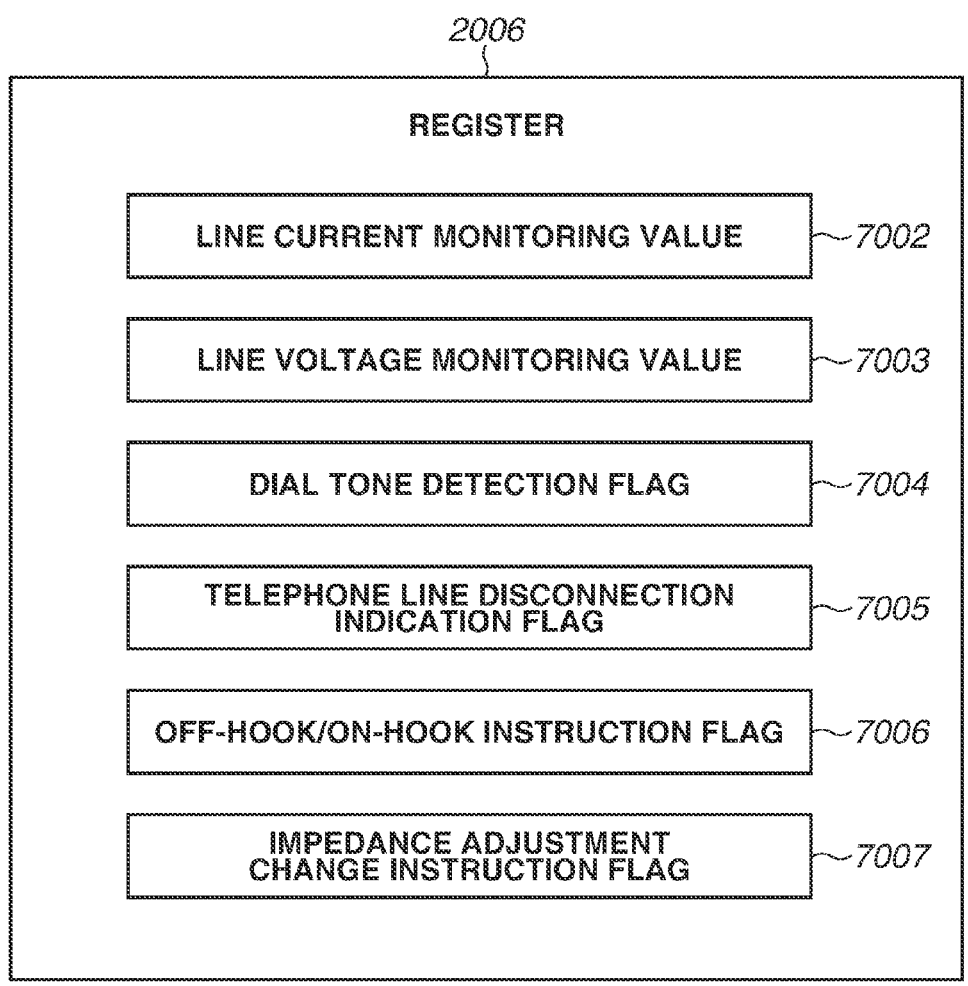
FIG. 7 illustrates contents of a register included in a modem.

FIG. 7 illustrates contents of the register 206.

A line current monitoring value 7002 is a register for retaining a current value detected by the SDAA 104. A line voltage monitoring value 7003 is a register for retaining a voltage value detected by the SDAA 104. A dial tone detection flag 7004 is a flag indicating whether a dial tone (DT) has been detected by the SDAA 104.

A telephone line disconnection indication flag 7005 is a flag indicating that the SDAA 104 has shifted to line disconnection, i.e., on-hook. An off-hook/on-hook instruction flag 7006 is a setting flag for issuing an instruction to cause the SDAA 104 to shift to direct-current capture, i.e., off-hook, or to line disconnection, i.e., on-hook, in response to an instruction from a host, i.e., the SOC 101.

An impedance adjustment change instruction flag 7007 is a flag for checking the line state and issuing an instruction to shift to predetermined second direct-current impedance adjustment corresponding to the line current based on a result of checking.

Figure 8:
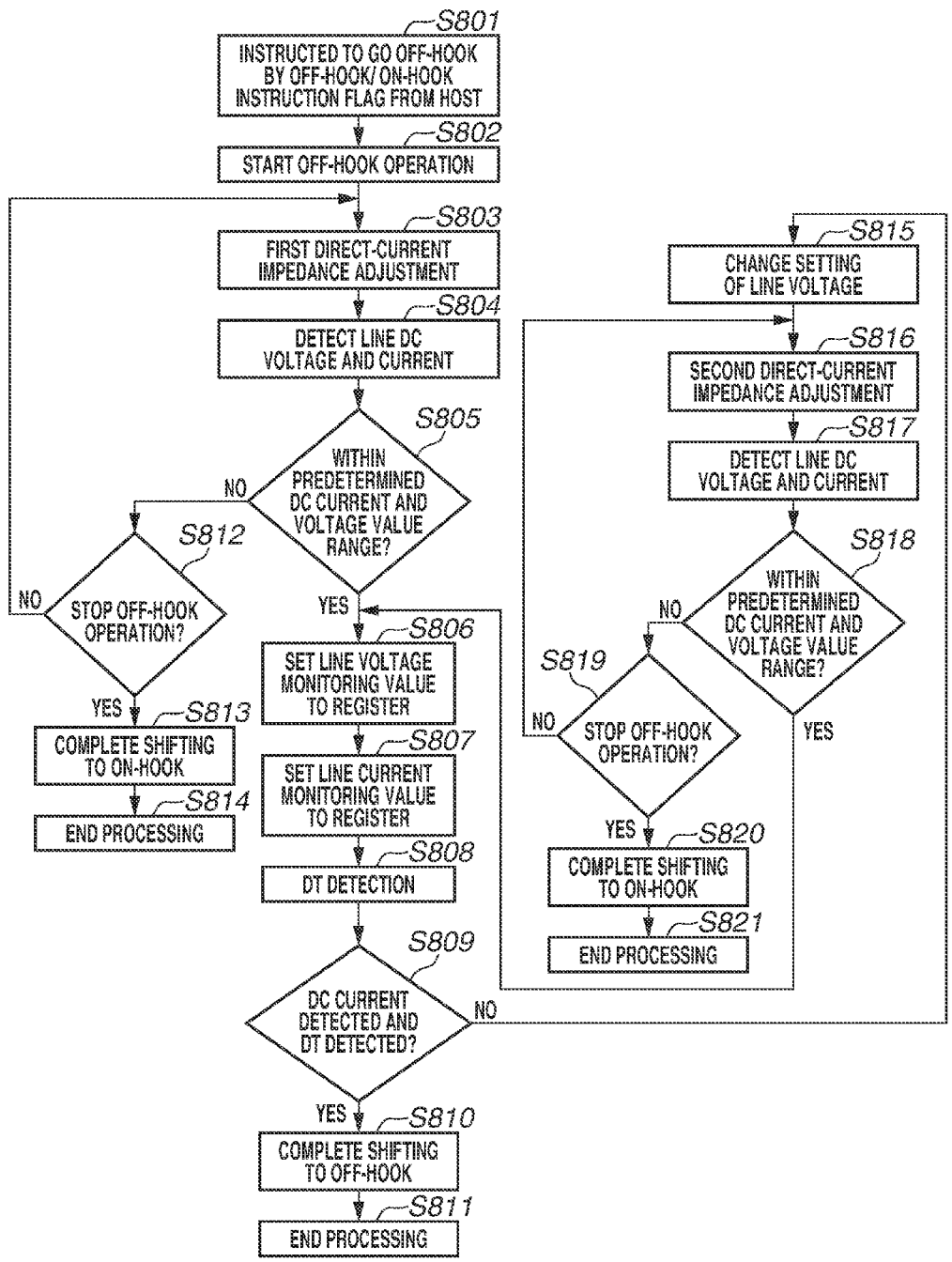
FIG. 8 is a flowchart illustrating an example of an operation of a facsimile apparatus according to a first exemplary embodiment.

FIG. 8 is a flowchart illustrating an example of an operation of the facsimile apparatus 100 according to the first exemplary embodiment, which corresponds to an operation example in a case where an operation is mainly performed with the facsimile apparatus 100. Processing illustrated in the flowchart of FIG. 8 is implemented by the DSP 205 executing a program loaded on the RAM 204. Moreover, the program to be executed by the DSP 205, which is described in detail below with reference to FIG. 9, corresponds to, for example, a program loaded from the ROM 203 onto the RAM 204 or a program transferred from the memory 140 and loaded onto the RAM 204 by the CPU 200 of the SOC 101.

In response to a FAX sending key or an off-hook key displayed on the operation panel 118 being pressed, the SOC 101 sets off-hook setting to the off-hook/on-hook instruction flag 7006. In step S801, the DSP 205 detects that off-hook setting has been set by the host, i.e., the SOC 101, to the off-hook/on-hook instruction flag 7006, and then in step S802, the DSP 205 controls the SDAA 104 to start an off-hook operation.

In step S803, the DSP 205 controls the SDAA 104 to cause the direct-current capture circuit 152 to perform first direct-current impedance Z (V/I) adjustment.

In step S804, the DSP 205, while performing the first direct-current impedance adjustment, detects a DC voltage and a DC current on the line using the voltage detection unit 150 and the current detection unit 151.

In step S805, the DSP 205 determines whether the DC voltage and the DC current detected in step S804 have been adjusted in such a way as to match the characteristic of the current I with respect to a previously set direct-current-like voltage V.

If the DSP 205 determines that the DC voltage and the DC current have not been adjusted in such a way as to match the characteristic of the current I with respect to the previously set direct-current-like voltage V (NO in step S805), the processing proceeds to step S812.

In step S812, the DSP 205 determines whether to stop the off-hook operation started in step S802. For example, when the first direct-current impedance adjustment has not yet been performed up to a predetermined number of times, the DSP 205 determines not to stop the off-hook operation, and, when the first direct-current impedance adjustment has already been performed the predetermined number of times, the DSP 205 determines to stop the off-hook operation. Moreover, when detecting that line disconnection, i.e., on-hook setting, has been set to the off-hook/on-hook instruction flag 7006 by the SOC 101, the DSP 205 also determines to stop the off-hook operation.

If the DSP 205 determines not to stop the off-hook operation (NO in step S812), the processing returns to step S803, in which the DSP 205 performs control to perform the first direct-current impedance Z (V/I) adjustment again.

On the other hand, if the DSP 205 determines to stop the off-hook operation (YES in step S812), then in step S813, the DSP 205 completes shifting to on-hook, and then in step S814, the DSP 205 ends the operation in the flowchart of FIG. 8.

On the other hand, if, in step S805, the DSP 205 determines that the DC voltage and the DC current have been adjusted in such a way as to match the characteristic of the current I with respect to the previously set direct-current-like voltage V (YES in step S805), the processing proceeds to step S806.

In step S806, the DSP 205 sets the DC voltage detected in step S804 to the line voltage monitoring value 7003. In step S807, the DSP 205 sets the DC current detected in step S804 to the line current monitoring value 7002.

In step S808, the DSP 205 controls the SDAA 104 to detect a dial tone (DT detection) using the DT detection unit 157.

Then, in step S809, the DSP 205 determines whether a predetermined DC current has been detected based on the line current monitoring value 7002 and whether a dial tone has been detected by the SDAA 104 based on the dial tone detection flag 7004. With this, the DSP 205 determines whether the off-hook operation is normal.

If the DSP 205 determines that the DC current has not been detected or that a dial tone has not been detected (NO in step S809), the DSP 205 determines that the off-hook operation is not normal, and then the processing proceeds to step S815.

In step S815, since the off-hook operation is not normal, the DSP 205 sets, to the impedance adjustment change instruction flag 7007, an instruction to change the converging line voltage in such a way as to obtain a direct-current impedance lower than that obtained in the first direct-current impedance adjustment. This step is performed to change the converting line voltage to, for example, 1 V in a case where, as a result of the first direct-current impedance adjustment, the line voltage has converged on a value on the straight line AC illustrated in FIG. 6, for example, the line voltage monitoring value 7003 has converged on a value equal to or greater than 6 V. With this, since the line voltage is adjusted in such a way as to converge on a point B on the straight line BC illustrated in FIG. 6, as a result, the direct-current impedance can be made to converge on a value lower than that obtained in the first direct-current impedance adjustment. Furthermore, while, in the present exemplary embodiment, a case has been described in which the current value is 20 mA, this is not limiting, and, since the operating voltage range on the straight line BC 6005 illustrated in FIG. 6 varies according to the current value, the converging line voltage also varies. Thus, it is necessary to change the line voltage to a value corresponding to the current value in the constant current operation.

In step S816, the DSP 205 controls the SDAA 104 to cause the direct-current capture circuit 152 to perform second direct-current impedance Z (V/I) adjustment.

Then, in step S817, the DSP 205, while performing the second direct-current impedance adjustment, detects a DC voltage and a DC current on the line using the voltage detection unit 150 and the current detection unit 151.

Next, in step S818, the DSP 205 determines whether the DC voltage and the DC current detected in step S817 have been adjusted in such a way as to match the characteristic of the current I with respect to a previously set direct-current-like voltage V.

If the DSP 205 determines that the DC voltage and the DC current have not been adjusted in such a way as to match the characteristic of the current I with respect to the previously set direct-current-like voltage V (NO in step S818), the processing proceeds to step S819.

In step S819, the DSP 205 determines whether to stop the off-hook operation started in step S802. For example, when the second direct-current impedance adjustment has not yet been performed up to a predetermined number of times, the DSP 205 determines not to stop the off-hook operation, and, when the second direct-current impedance adjustment has already been performed the predetermined number of times, the DSP 205 determines to stop the off-hook operation. Moreover, when detecting that, line disconnection, i.e., on-hook setting, has been set to the off-hook/on-hook instruction flag 7006 by the SOC 101, the DSP 205 also determines to stop the off-hook operation.

If the DSP 205 determines not to stop the off-hook operation (NO in step S819), the processing returns to step S816, in which the DSP 205 performs control to perform the second direct-current impedance Z (V/I) adjustment again.

On the other hand, if the DSP 205 determines to stop the off-hook operation (YES in step S819), then in step S820, the DSP 205 completes shifting to on-hook, and then in step S821, the DSP 205 ends the operation in the flowchart of FIG. 8.

On the other hand, if, in step S818, the DSP 205 determines that the DC voltage and the DC current have been adjusted in such a way as to match the characteristic of the current I with respect to the previously set direct-current-like voltage V (YES in step S818), the processing proceeds to step S806. In this case, the DSP 205, in step S806, sets the DC voltage detected in step S817 to the line voltage monitoring value 7003, and then in step S807, sets the DC current detected in step S817 to the line current monitoring value 7002. Subsequently, the DSP 205 performs DT detection in step S808, and then performs the determination in step S809 to repeat the above-described operation. Furthermore, during a period when the result of the determination in step S809 is NO, the DSP 205 can be configured to repeat the second direct-current impedance adjustment until the previously set lower limit of the impedance or voltage allowed according to the line current is reached. Then, in a case where, even when the lower limit of the impedance or voltage allowed according to the line current is reached, the result of the determination in step S809 is NO, the DSP 205 can be configured to complete shifting to on-hook and then end the operation in the flowchart of FIG. 8.

If, in step S809, the DSP 205 determines that the DC current has been detected and the dial tone has been detected (YES in step S809), the DSP 205 determines that the off-hook operation is normal, and then the processing proceeds to step S810. In step S810, the DSP 205 completes shifting to off-hook, and then in step S811, the DSP 205 ends the operation in the flowchart of FIG. 8.

Figure 9:
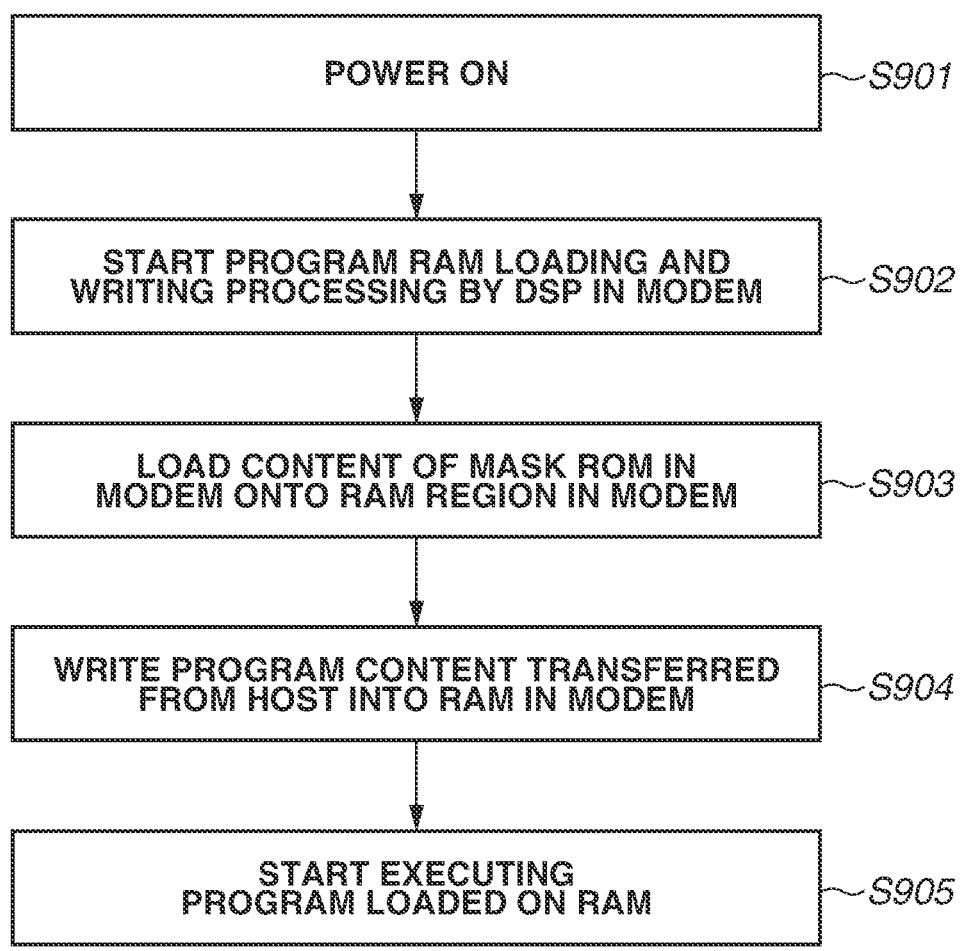
FIG. 9 is a flowchart illustrating an example of a program loading operation of a system on chip (SOC).

FIG. 9 is a flowchart illustrating an example of a program loading operation of the SOC 101. Processing in the flowchart of FIG. 9 is implemented by the CPU 200 of the SOC 101 executing a program stored in the memory 140.

When, in step S901, the main power source (not illustrated) of the facsimile apparatus 100 is turned on, then in step S902, the SOC 101 starts processing for loading a program onto the RAM 204 (program RAM loading and writing processing by DSP in modem).

First, in step S903, the SOC 101 loads a program stored in the ROM 203 onto the RAM 204.

Next, in step S904, the SOC 101 loads the SDAA program 202 transferred from the memory 140 onto the RAM 204.

Next, in step S905, the SOC 101 causes the DSP 205 to start executing the programs loaded on the RAM 204. This enables the processing illustrated in FIG. 8 to be performed.

In the present exemplary embodiment, one of the factors used to determine, in step S809 illustrated in FIG. 8, whether the off-hook operation is normal is that a predetermined DC current is detected based on the line current monitoring value 7002, in other words, that a DC current is flowing.

However, during the process of performing direct-current impedance adjustment, controlling the SDAA 104 to periodically monitor the line current monitoring value 7002 enables detecting a constant current operation if a change of current is small. Accordingly, one of the factors used for the determination in step S809 illustrated in FIG. 8 can be that the constant current operation is being performed instead of that a predetermined DC current is detected, so that the reason why a normal operation is not being performed can be more accurately determined.

In the present exemplary embodiment, the program is executed to check the line state and, based on a result of checking, to automatically shift to predetermined second direct-current impedance adjustment corresponding to the line current. Herein, in a case where the second direct-current impedance adjustment has been automatically performed, the DSP 205 can store a result of the adjustment in the memory 140, and, after that, can perform the second direct-current impedance adjustment based on the stored result of the adjustment without performing the first direct-current impedance adjustment.

Furthermore, when performing an operation of checking the line state and shifting to the second direct-current impedance adjustment, the DSP 205 can, without automatically performing the operation, notify the user of the operation via displaying on the display unit 119 of the operation panel 118 and can allow the user to manually perform the second direct-current impedance adjustment by operating the operation panel 118. Moreover, in a case where the second direct-current impedance adjustment has been manually performed, the DSP 205 can store a result of the adjustment in the memory 140, and, after that, can perform the second direct-current impedance adjustment based on the stored result of the adjustment without performing the first direct-current impedance adjustment. These changes of processing operations can be effected by modifying the SDAA program 202 stored in the memory 140 and loading the modified SDAA program 202 onto the RAM 204.

As described above, in the first exemplary embodiment, in a case where a terminal adapter (TA) and a facsimile apparatus are connected, the line state is checked after the first direct-current impedance adjustment performed during the process of an off-hook operation, and the second direct-current impedance adjustment corresponding to the line current is performed based on a result of checking. Therefore, even in a case where the connected TA has such a constant current characteristic as to supply a constant off-hook current, the facsimile apparatus is able to perform line capture by making adjustment to obtain a current value required for the TA to operate, in other words, a sufficiently small impedance, and is thus capable of preventing a false operation. For example, the facsimile apparatus is capable of preventing such a false operation as to be unable to go off-hook.

In the above-described first exemplary embodiment, with reference to FIG. 8, an example has been described for processing performed in a case where the user, when performing facsimile transmission or making a phone call, operates the facsimile apparatus 100 to start an off-hook operation. However, a second exemplary embodiment is not limited to that case, but can also be applied to a case where the off-hook operation is started at the time of reception. The second exemplary embodiment is described in detail as follows.

Figure 10:
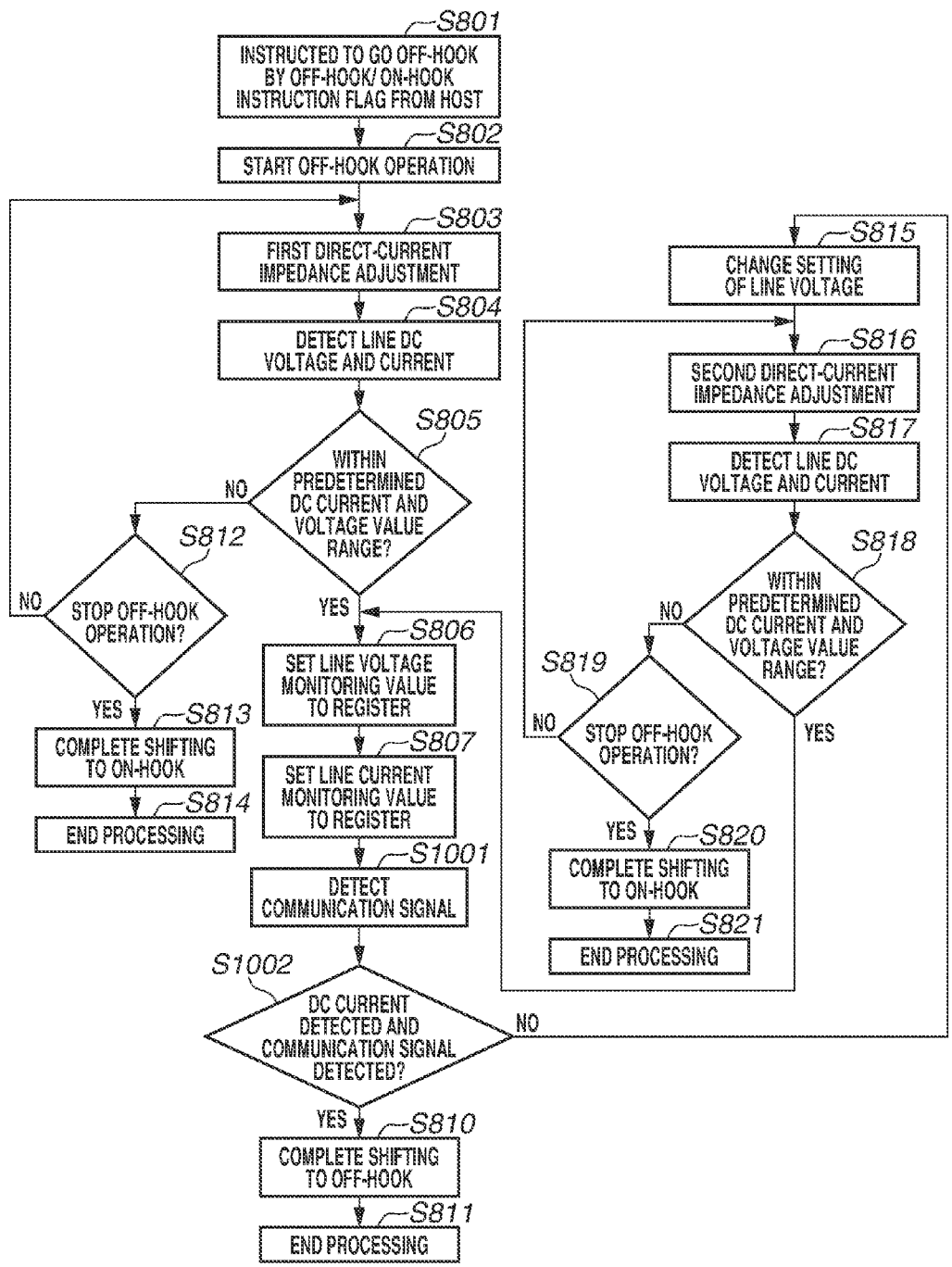
FIG. 10 is a flowchart illustrating an example of an operation of a facsimile apparatus according to a second exemplary embodiment.

FIG. 10 is a flowchart illustrating an example of an operation of the facsimile apparatus 100 according to the second exemplary embodiment. Furthermore, the same steps as those illustrated in FIG. 8 are assigned the respective same step numbers. Processing illustrated in the flowchart of FIG. 10 is implemented by the DSP 205 executing a program loaded on the RAM 204. Moreover, the program to be executed by the DSP 205, as described above with reference to FIG. 9, corresponds to, for example, a program loaded from the ROM 203 onto the RAM 204 or a program transferred from the memory 140 and loaded onto the RAM 204 by the CPU 200 of the SOC 101.

When the CI detection signal 109 output from the CI detection circuit 108 detecting reception of the CI signal from the communication line is input to the SOC 101, the SOC 101 sets off-hook setting to the off-hook/on-hook instruction flag 7006. In step S801, the DSP 205 detects that off-hook setting has been set by the host, i.e., the SOC 101, to the off-hook/on-hook instruction flag 7006, and then in step S802, the DSP 205 controls the SDAA 104 to start an off-hook operation. Furthermore, step S801 illustrated in FIG. 10 is the same as step S801 illustrated in FIG. 8 in that the DSP 205 detects an off-hook instruction from the SOC 101 serving as a host and starts off-hook in step S802. However, the factor of the off-hook instruction is attributable to reception of the CI signal from the communication line.

Moreover, while steps S1001 and S1002 illustrated in FIG. 10 are different from steps S808 and S809 illustrated in FIG. 8, the other steps are the same as those illustrated in FIG. 8, and the description thereof is, therefore, omitted.

After step S807, in step S1001, the DSP 205 controls the SDAA 104 to cause a communication signal detection unit, which is described below, to detect a communication signal. Herein, the communication signal detection unit is a unit configured to detect a communication signal to be essentially received (an intrinsic communication signal), for example, of the T.30 communication sequence. Moreover, examples of the communication signal to be essentially received include a calling tone (CNG) signal, which indicates a FAX apparatus having autodial capability, a digital command signal (DCS), which informs the called FAX apparatus of the specified mode for reception, a training signal, which is sent to regulate the reception state of a modem of the receiving FAX apparatus, and a training check frame (TCF) signal, which is sent using a modem specified by a DCS. These communication signals can be detected by controlling the SDAA 104, but can also be detected by the modem 102, which manages the T.30 communication sequence. Thus, the above-mentioned communication signal detection unit corresponds to, for example, the SDAA 104 or the modem 102.

Next, in step S1002, the DSP 205 determines whether the off-hook operation is normal by checking whether a predetermined DC current has been detected based on the line current monitoring value 7002 and whether the above-mentioned communication signal has been detected by the above-mentioned communication signal detection unit. This step is performed to execute second direct-current impedance adjustment in a case where, as a result of detection of the line current during off-hook and further detection of a communication signal serving as a line signal in step S1001, a predetermined current has been detected but an intrinsic communication signal has not been detected.

If the DSP 205 determines that the DC current has not been detected or that the above-mentioned communication signal has not been detected (NO in step S1002), the DSP 205 determines that the off-hook operation is not normal, and then the processing proceeds to step S815.

On the other hand, if the DSP 205 determines that the DC current has been detected and the above-mentioned communication signal has been detected (YES in step S1002), the DSP 205 determines that the off-hook operation is normal, and then the processing proceeds to step S810. The subsequent processing is the same as in FIG. 8, and is, therefore, omitted from description.

According to the second exemplary embodiment, even in a case where the connected TA has such a constant current characteristic as to supply a constant off-hook current, the facsimile apparatus is able to perform line capture by making adjustment to obtain a current value required for the TA to operate, in other words, a sufficiently small impedance, and is thus capable of preventing a false operation. For example, the facsimile apparatus is capable of preventing such a false operation as to be unable to go off-hook.

In a third exemplary embodiment, automatic reception operation control of the facsimile apparatus 100 is described.

Figure 11:
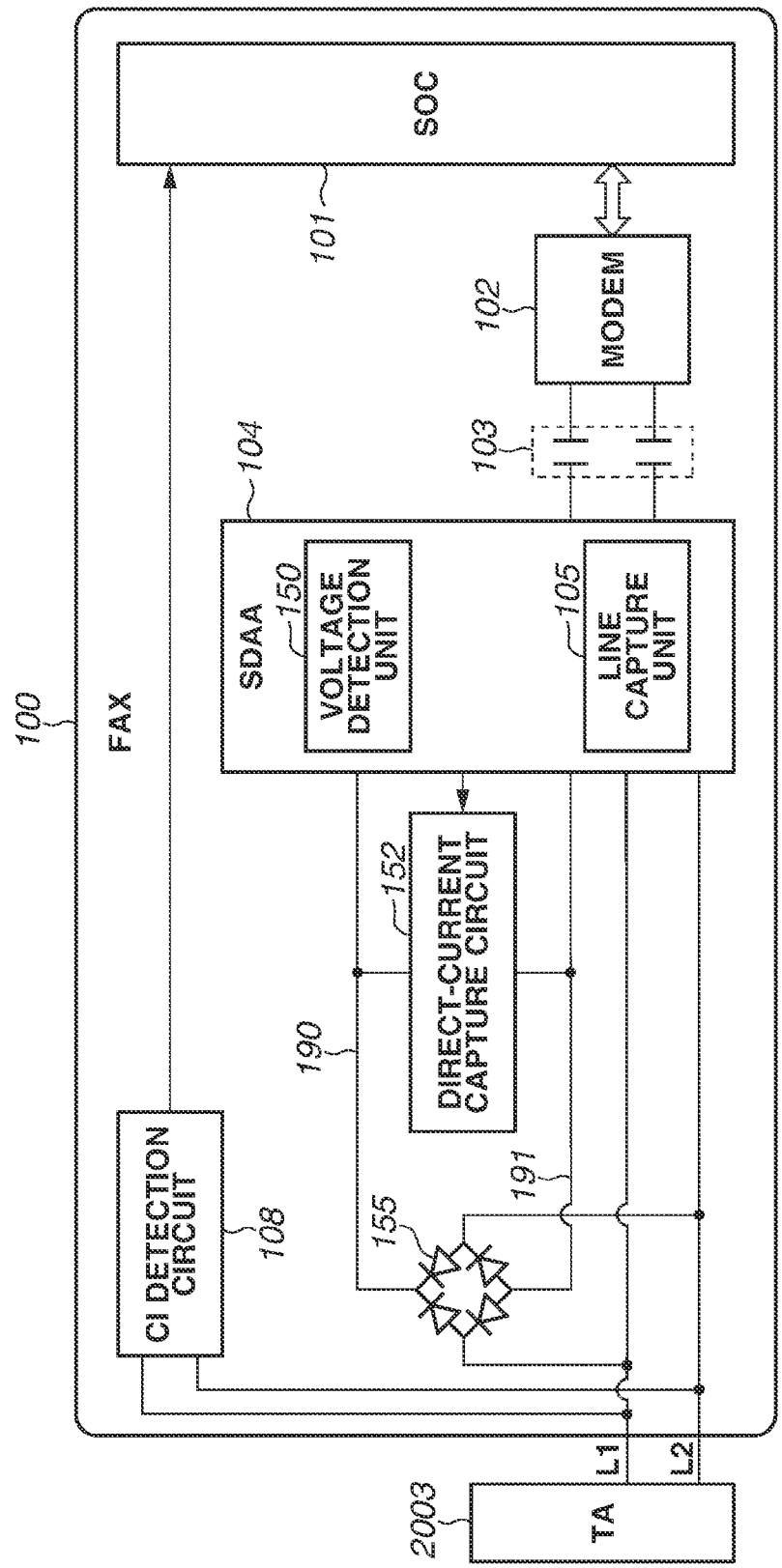
FIG. 11 is a block diagram illustrating an example of a characteristic configuration of a facsimile apparatus according to a third exemplary embodiment.

FIG. 11 is a block diagram illustrating an example of a characteristic configuration of the facsimile apparatus 100 according to the third exemplary embodiment. The same elements as those illustrated in FIGS. 1 and 2 are assigned the respective same reference numerals.

Figure 12:
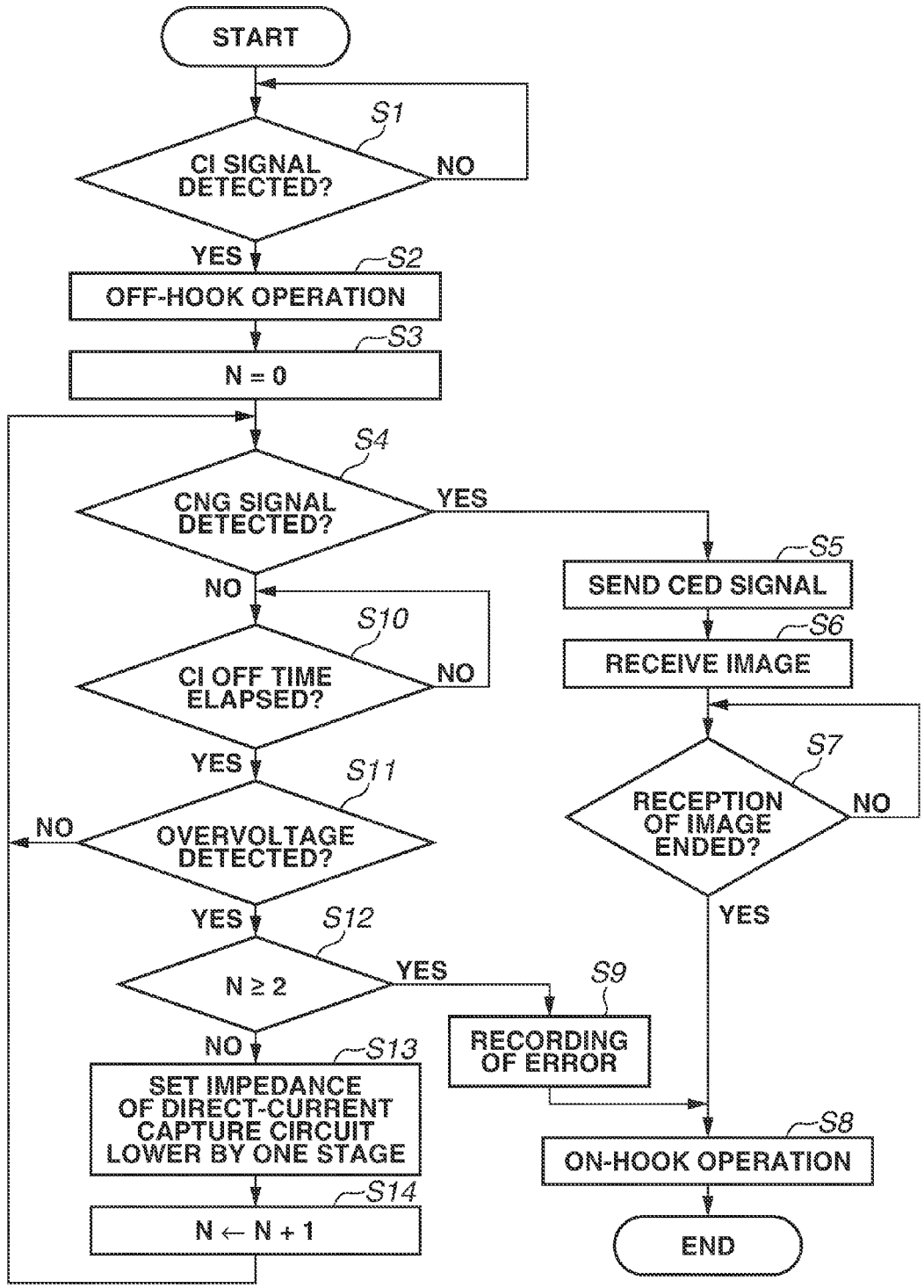
FIG. 12 is a flowchart illustrating an example of an automatic reception operation of the facsimile apparatus according to the third exemplary embodiment.

FIG. 12 is a flowchart illustrating an example of an automatic reception operation of the facsimile apparatus 100 according to the third exemplary embodiment.

Figure 15:
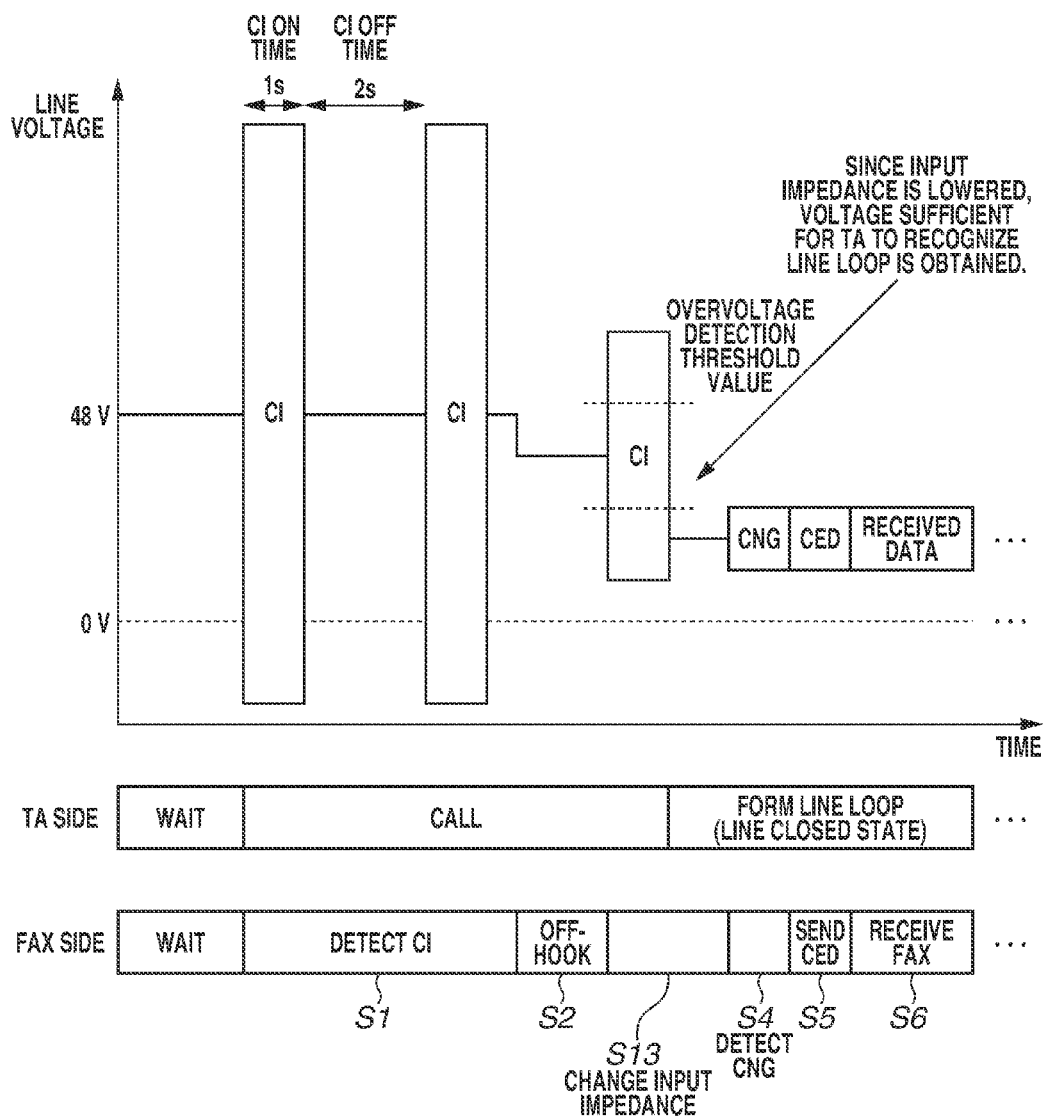
FIG. 15 is a timing chart in a case where the terminal adapter has recognized a line closed state.
Figure 16:
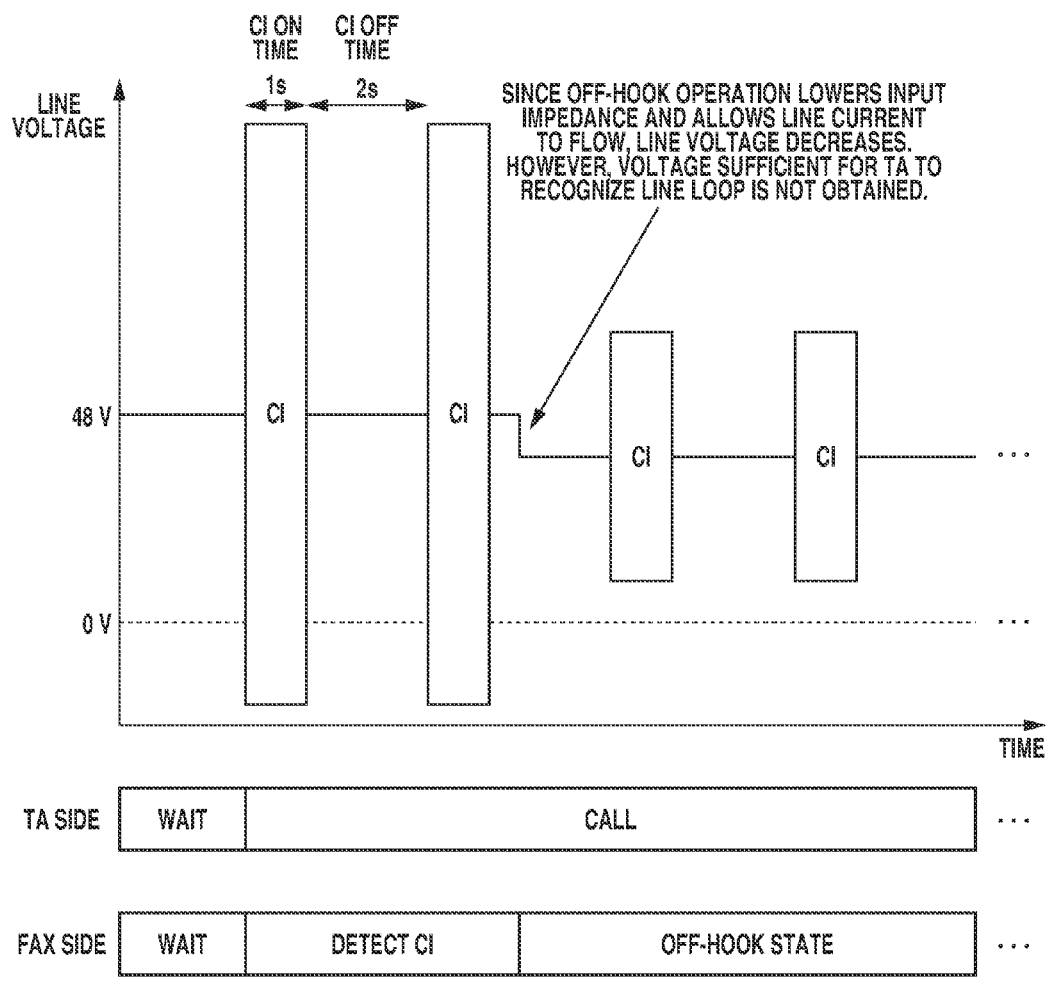
FIG. 16 is a timing chart in a case where the terminal adapter does not recognize a line closed state.

FIG. 15 is a timing chart illustrating a condition in a case where the terminal adapter 2003 has recognized a line closed state during setting of facsimile automatic reception.

An automatic reception operation of the facsimile apparatus 100 is described below with reference to the flowchart of FIG. 12. Furthermore, processing performed by the SOC 101 illustrated in the flowchart of FIG. 12 is implemented by the SOC 101 executing a program stored in the memory 140. Moreover, processing performed by the modem 102 is implemented by the DSP 205 executing a program loaded on the RAM 204. Additionally, the program to be executed by the DSP 205, as described above with reference to FIG. 9, corresponds to, for example, a program loaded from the ROM 203 onto the RAM 204 or a program transferred from the memory 140 and loaded onto the RAM 204 by the CPU 200 of the SOC 101.

In step S1, the facsimile apparatus 100 waits for CI signal detection. More specifically, when the CI signal output from the terminal adapter 2003 is detected by the CI detection circuit 108, the CI detection signal 109 is output to the SOC 101. Based on the CI detection signal 109, the SOC 101 determines whether the cadence of the CI signal has occurred a specified number of times, i.e., two times, as illustrated in the timing chart of FIG. 15. At this time, the SOC 101 also measures the CI signal off time of the detected CI signal based on the CI detection signal 109.

If, in step S1, when confirming the occurrence of the CI signal cadence the specified number of times, the SOC 101 determines that the CI signal has been detected (YES in step S1), the processing proceeds to step S2.

In step S2, after confirming the determination of the CI signal cadence the specified number of times in step S1, the facsimile apparatus 100 performs an off-hook operation at the timing of the CI signal off. More specifically, the SOC 101 issues an off-hook operation instruction to the line capture unit 105 of the SDAA 104 via the modem 102. In response to the off-hook operation instruction, the line capture unit 105 controls the input impedance of the direct-current capture circuit 152 to form an off-hook state. When the facsimile apparatus 100 enters the off-hook state, the positive voltage signal 190, the direct-current capture circuit 152, and the negative voltage signal 191 form a line current loop via the rectification circuit 155.

In step S3, the facsimile apparatus 100 clears the counter value N to "0". More specifically, the counter value N is managed by the SOC 101, and is a variable indicating the number of times that an overvoltage is detected in an overvoltage detection step during off-hook, which is step S11 described below. Thus, the SOC 101 initializes the counter value N to "0".

In step S4, the facsimile apparatus 100 determines detection of the CNG signal sent from a sending source facsimile apparatus. More specifically, when the terminal adapter 2003 normally recognizes a line closed state in response to the off-hook operation of the facsimile apparatus 100, the call is established, and the CNG signal is detected by the modem 102 via the SDAA 104. While, depending on calls, the sending source may be not a facsimile apparatus but a person's phone call, since this is not related to the gist of embodiments the present invention, such a case is omitted from the flowchart of FIG. 12.

If the CNG signal is detected by the modem 102 (YES in step S4), the processing proceeds to step S5.

In step S5, the facsimile apparatus 100 sends a called station identification (CED) signal in reply according to detection of the CNG signal. More specifically, the modem 102 outputs a CED signal in a predetermined procedure and sends the CED signal in reply to the sending source facsimile apparatus via the SDAA 104 and the terminal adapter 2003. After that, although not illustrated in the flowchart, the modem 102 performs detailed negotiation with the sending source facsimile apparatus.

In step S6, the facsimile apparatus 100 receives an image signal sent from the sending source facsimile apparatus. More specifically, the modem 102 demodulates an image signal received as an audio signal into digital data and outputs the digital data to the SOC 101.

In step S7, the facsimile apparatus 100 determines whether reception of the image signal has ended. More specifically, when receiving a disconnect (DCN) signal sent from the sending source facsimile apparatus, the modem 102 transmits a notification indicating the ending of reception to the SOC 101. When receiving the notification indicating the ending of reception from the modem 102, the SOC 101 determines that reception of the image signal has ended (YES in step S7), and the processing then proceeds to step S8.

In step S8, the facsimile apparatus 100 performs an on-hook operation (line opening). More specifically, the SOC 101 issues an on-hook operation instruction to the line capture unit 105 of the SDAA 104 via the modem 102. In response to the on-hook operation instruction, the line capture unit 105 controls the input impedance of the direct-current capture circuit 152 to form an on-hook state, thus opening the line.

Furthermore, if, in step S4, the SOC 101 determines that the CNG signal is not detected by the modem 102 (NO in step S4), the processing proceeds to step S10.

In step S10, the facsimile apparatus 100 measures and waits the time of the CI signal off. More specifically, the SOC 101 waits for the CI signal off time (the CI off time) measured in step S1 (YES in step S10), and the processing then proceeds to step S11.

In step S11, the facsimile apparatus 100 detects an overvoltage of the line. More specifically, in the facsimile apparatus 100, the voltage detection unit 150 included in the SDAA 104 monitors a voltage between the positive voltage signal 190 and the negative voltage signal 191. In a case where the terminal adapter 2003 has not recognized a line closed state, a CI signal exceeding the voltage of an ordinary audio signal level is applied. The SOC 101 determines whether a voltage equal to or higher than a threshold value (overvoltage) has been detected by the voltage detection unit 150.

If the SOC 101 determines that a voltage equal to or higher than the threshold value (overvoltage) has not been detected by the voltage detection unit 150 (NO in step S11), the processing returns to step S4.

On the other hand, if the SOC 101 determines that a voltage equal to or higher than the threshold value (overvoltage) has been detected by the voltage detection unit 150 (YES in step S11), the SOC 101 determines that the terminal adapter 2003 has not recognized a line closed state, and the processing then proceeds to step S12.

In step S12, the facsimile apparatus 100 determines whether the counter value N is equal to or greater than "2". More specifically, the SOC 101 performs processing for determining the counter value N. Furthermore, the determination value is not necessarily "2", but can be another numerical value as appropriate.

If the SOC 101 determines that the counter value N is less than "2" (NO in step S12), the processing proceeds to step S13.

In step S13, the facsimile apparatus 100 sets the impedance of the direct-current capture circuit 152 lower by a predetermined amount. More specifically, the SOC 101 controls the line capture unit 105 included in the SDAA 104 via the modem 102 to set the impedance of the direct-current capture circuit 152 lower by the predetermined amount.

In step S14, the facsimile apparatus 100 increments the counter value N. More specifically, the SOC 101 performs processing for incrementing the counter value N, and the processing then returns to step S4.

Furthermore, if, in step S12, the SOC 101 determines that the counter value N is equal to or greater than "2" (YES in step S12), the processing proceeds to step S9.

In step S9, the facsimile apparatus 100 reserves the record of an error when the counter value N is equal to or greater than "2". More specifically, the SOC 101 performs error recording processing, and then in step S8, performs an on-hook operation. After performing the on-hook operation, although not illustrated in the flowchart, the SOC 101 also performs processing for causing the recording unit 122 to output an error report or causing the display device 119 to display an error message. Thus, in the case of the present exemplary embodiment, the SOC 101 of the facsimile apparatus 100 performs processing for lowering the impedance of the direct-current capture circuit 152 by up to two stages, but, in a situation in which a CI signal input is still detected, performs control to process the situation as an error.

As described above, the third exemplary embodiment has a configuration in which, when a CI signal input is detected after off-hook of the facsimile apparatus 100, the line capture unit 105 and the direct-current capture circuit 152 are controlled in such a way as to increase the line current, so that the call with the terminal adapter is established. With this, when the facsimile apparatus has entered an off-hook state during setting of automatic reception, even in a case where, as a sufficient current is not obtained from the line side, the line side does not recognize a line closed state, the facsimile apparatus can increase the line current, cause the line side to recognize a line closed state, and perform automatic reception. Therefore, even a facsimile apparatus connected to a terminal adapter (TA) having a constant current characteristic for supplying a constant off-hook current can automatically receive facsimile transmission.

A fourth exemplary embodiment includes the above-described configuration and control operations of the third exemplary embodiment, and, therefore, common features thereof are omitted from the following description and only different features thereof are described below.

Figure 13:
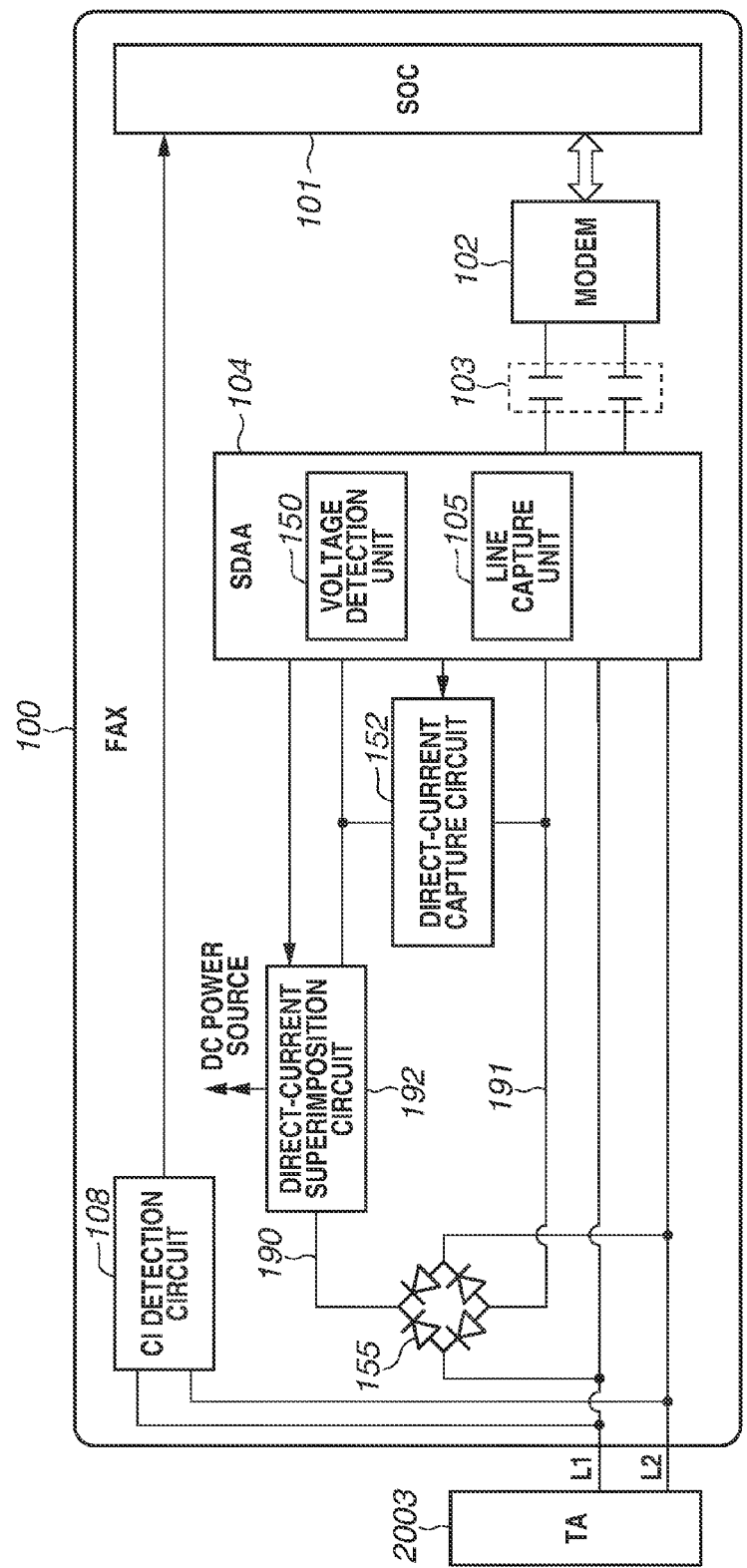
FIG. 13 is a block diagram illustrating an example of a characteristic configuration of a facsimile apparatus according to a fourth exemplary embodiment.

FIG. 13 is a block diagram illustrating an example of a characteristic configuration of a facsimile apparatus 100 according to the fourth exemplary embodiment, in which the same elements as those illustrated in FIG. 11 are assigned the respective same reference numerals.

Referring to FIG. 13, a direct-current superimposition circuit 192 is connected in series with the direct-current capture circuit 152. The direct-current superimposition circuit 192 uses an internal DC power source (internal power source) of the facsimile apparatus 100 as a power source thereof and superimposes a predetermined DC current on the positive voltage signal 190 under the control of the line capture unit 105 of the SDAA 104.

Figure 14:
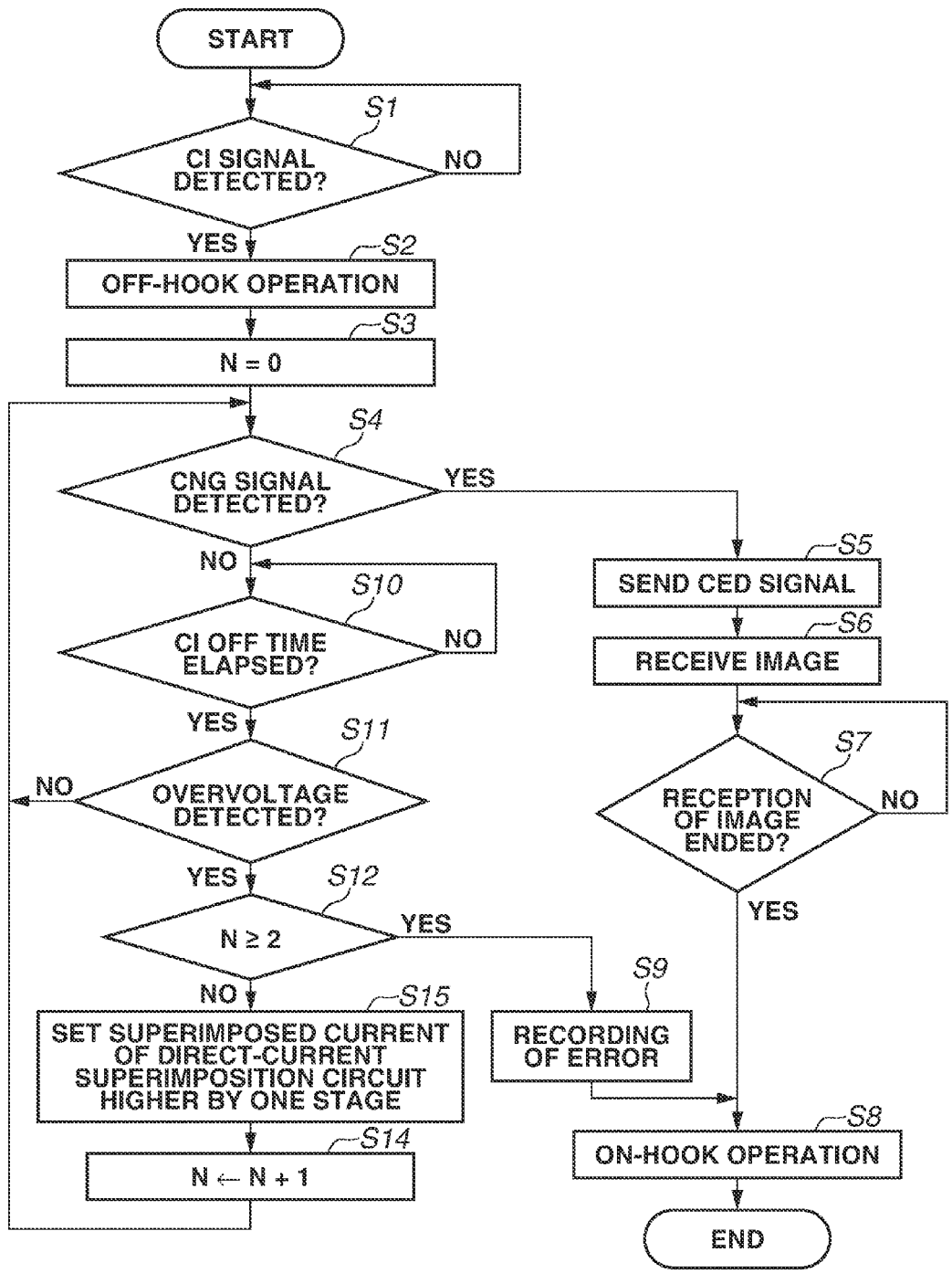
FIG. 14 is a flowchart illustrating an example of an automatic reception operation of the facsimile apparatus according to the fourth exemplary embodiment.

FIG. 14 is a flowchart illustrating an example of an automatic reception operation of the facsimile apparatus 100 according to the fourth exemplary embodiment, in which the same steps as those illustrated in FIG. 12 are assigned the respective same step numbers.

The automatic reception operation of the facsimile apparatus 100 according to the fourth exemplary embodiment is described below with reference to the flowchart of FIG. 14. Furthermore, processing performed by the SOC 101 illustrated in the flowchart of FIG. 14 is implemented by the SOC 101 executing a program stored in the memory 140. Moreover, processing performed by the modem 102 is implemented by the DSP 205 executing a program loaded on the RAM 204. Additionally, the program to be executed by the DSP 205, as described above with reference to FIG. 9, corresponds to, for example, a program loaded from the ROM 203 onto the RAM 204 or a program transferred from the memory 140 and loaded onto the RAM 204 by the CPU 200 of the SOC 101.

In the case of the fourth exemplary embodiment, if, in step S12, the SOC 101 determines that the counter value N is less than 2 (NO in step S12), the processing proceeds to step S15.

In step S15, the facsimile apparatus 100 sets a superimposed current of the direct-current superimposition circuit 192 higher by a predetermined amount. More specifically, the SOC 101 controls the line capture unit 105 included in the SDAA 104 via the modem 102 to set the superimposed current of the direct-current superimposition circuit 192 higher by the predetermined amount.

As described above, the fourth exemplary embodiment has a configuration in which, when a CI signal input is detected after off-hook of the facsimile apparatus 100, the line capture unit 105 and the direct-current superimposition circuit 192 are controlled in such a way as to increase the line current, so that the call with the terminal adapter is established. With this, when the facsimile apparatus has entered an off-hook state during setting of automatic reception, even in a case where, as a sufficient current is not obtained from the line side, the line side does not recognize a line closed state, the facsimile apparatus can increase the line current, cause the line side to recognize a line closed state, and perform automatic reception. Therefore, even a facsimile apparatus connected to a terminal adapter (TA) having a constant current characteristic for supplying a constant off-hook current can automatically receive facsimile transmission.

Furthermore, the structures and contents of the above-described various pieces of data are not limiting, but can be modified to various structures and contents according to the intended uses or purposes.

While some exemplary embodiments have been described above, the present invention can also be embodied as, for example, a system, an apparatus, a method, a program, or a storage medium. More specifically, each exemplary embodiment can also be applied to a system composed of a plurality of devices or can also be applied to an apparatus composed of a single device.

Moreover, any configuration obtained by combining some or all of the above-described exemplary embodiments is also included in the present invention.

The present invention can also be implemented by processing for supplying a program for implementing one or more functions of the above-described exemplary embodiments to a system or apparatus via a network or storage medium, and for causing one or more processors in a computer of the system or apparatus to read and execute the program. Additionally, the present invention can also be implemented by a circuit that implements one or more functions (for example, application specific integrated circuits (ASIC).

Furthermore, the present invention can also be applied to a system composed of a plurality of devices or can also be applied to an apparatus composed of a single device.

The present invention should not be construed to be limited to the above-described exemplary embodiments, but can be changed to various modification examples (including an organic combination of exemplary embodiments) based on the gist of the present invention, which should not be excluded from the scope of the present invention. Thus, any configuration obtained by combining at least one of the above-described exemplary embodiments with at least one of such modification examples is also included in the present invention.

Other Embodiments

Embodiment(s) of the present invention can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random access memory (RAM), a read-only memory (ROM), a storage of distributed computing systems, an optical disk (such as a compact disc (CD), digital versatile disc (DVD), or Blu-ray Disc (BD)™), a flash memory device, a memory card, and the like.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2015-184786 filed Sep. 18, 2015, which is hereby incorporated by reference herein in its entirety.

What is claimed is:

1. A communication apparatus that captures a line according to an off-hook operation, the communication apparatus comprising:

a first adjustment unit configured to perform first impedance adjustment according to detection of the off-hook operation;

a detection unit configured to detect a line current and a dial tone signal; and a second adjustment unit configured to perform second impedance adjustment based on the line current when the dial tone signal is not detected by the detection unit after the first impedance adjustment is performed by the first adjustment unit, wherein the second impedance adjustment is performed to obtain an impedance lower than an impedance obtained by the first impedance adjustment being performed, and wherein, during a period when the dial tone signal is not detected by the detection unit, the second adjustment unit repeats the second impedance adjustment until a previously set lower limit of impedance is reached.

2. The communication apparatus according to claim 1, wherein the second impedance adjustment is performed to obtain a line voltage lower than a line voltage obtained by the first impedance adjustment being performed.

3. A communication apparatus that captures a line according to an off-hook operation, the communication apparatus comprising:

a first adjustment unit configured to perform first impedance adjustment according to detection of the off-hook operation;

a detection unit configured to detect a line current and a dial tone signal; and a second adjustment unit configured to perform second impedance adjustment based on the line current when the dial tone signal is not detected by the detection unit after the first impedance adjustment is performed by the first adjustment unit, wherein the second impedance adjustment is performed to obtain a line voltage lower than a line voltage obtained by the first impedance adjustment being performed, and wherein, during a period when the dial tone signal is not detected by the detection unit, the second adjustment unit repeats the second impedance adjustment until a previously set lower limit of line voltage is reached.

4. The communication apparatus according to claim 1, further comprising a determination unit configured to determine whether the line current has a predetermined constant current characteristic during a process of the off-hook operation, wherein, if it is determined by the determination unit that the line current does not have the predetermined constant current characteristic, the first adjustment unit re-performs the first impedance adjustment.

5. The communication apparatus according to claim 1, wherein, after performing the second impedance adjustment, the second adjustment unit stores a result of the second impedance adjustment, and, after that and without the first impedance adjustment being performed, the second adjustment unit performs the second impedance adjustment based on the stored result.

6. A control method for a communication apparatus that captures a line according to an off-hook operation, the control method comprising:

performing, as a first adjustment, first impedance adjustment according to detection of the off-hook operation;

detecting a line current; and a dial tone signal; and performing, as a second adjustment, second impedance adjustment based on the line current when the dial tone signal is not detected after the first impedance adjustment is performed by the first adjustment, wherein the second impedance adjustment is performed to obtain an impedance lower than an impedance obtained by the first impedance adjustment being performed, and wherein, during a period when the dial tone signal is not detected, the second adjustment repeats the second impedance adjustment until a previously set lower limit of impedance is reached.

7. A non-transitory computer-readable storage medium storing computer-executable instructions that, when executed by a computer, cause the computer to perform a control method for a communication apparatus that captures a line according to an off-hook operation, the control method comprising:

performing, as a first adjustment, first impedance adjustment according to detection of the off-hook operation;

detecting a line current; and a dial tone signal; and performing, as a second adjustment, second impedance adjustment based on the line current when the dial tone signal is not detected after the first impedance adjustment is performed by the first adjustment, wherein the second impedance adjustment is performed to obtain an impedance lower than an impedance obtained by the first impedance adjustment being performed, and wherein, during a period when the dial tone signal is not detected, the second adjustment repeats the second impedance adjustment until a previously set lower limit of impedance is reached.

8. The communication apparatus according to claim 3, further comprising a determination unit configured to determine whether the line current has a predetermined constant current characteristic during a process of the off-hook operation, wherein, if it is determined by the determination unit that the line current does not have the predetermined constant current characteristic, the first adjustment unit re-performs the first impedance adjustment.

9. The communication apparatus according to claim 3, wherein, after performing the second impedance adjustment, the second adjustment unit stores a result of the second impedance adjustment and, after that and without the first impedance adjustment being performed, the second adjustment unit performs the second impedance adjustment based on the stored result.

10. A communication apparatus that captures a line according to an off-hook operation, the communication apparatus comprising:

a first adjustment unit configured to perform first impedance adjustment according to detection of the off-hook operation;

a detection unit configured to detect a line current and a dial tone signal; and a second adjustment unit configured to perform second impedance adjustment based on the line current when the dial tone signal is not detected by the detection unit after the first impedance adjustment is performed by the first adjustment unit, wherein, after performing the second impedance adjustment, the second adjustment unit stores a result of the second impedance adjustment and, after that and without the first impedance adjustment being performed, the second adjustment unit performs the second impedance adjustment based on the stored result.

11. The communication apparatus according to claim 10, wherein the second impedance adjustment is performed to obtain an impedance lower than an impedance obtained by the first impedance adjustment being performed.

12. The communication apparatus according to claim 11, wherein, during a period when the dial tone signal is not detected by the detection unit, the second adjustment unit repeats the second impedance adjustment until a previously set lower limit of impedance is reached.

13. The communication apparatus according to claim 10, wherein the second impedance adjustment is performed to obtain a line voltage lower than a line voltage obtained by the first impedance adjustment being performed.

14. The communication apparatus according to claim 10, further comprising a determination unit configured to determine whether the line current has a predetermined constant current characteristic during a process of the off-hook operation, wherein, if it is determined by the determination unit that the line current does not have the predetermined constant current characteristic, the first adjustment unit re-performs the first impedance adjustment.

15. A control method for a communication apparatus that captures a line according to an off-hook operation, the control method comprising:

performing, as a first adjustment, first impedance adjustment according to detection of the off-hook operation;

detecting a line current and a dial tone signal; and performing, as a second adjustment, second impedance adjustment based on the line current when the dial tone signal is not detected after the first impedance adjustment is performed by the first adjustment, wherein the second impedance adjustment is performed to obtain a line voltage lower than a line voltage obtained by the first impedance adjustment being performed, and wherein, during a period when the dial tone signal is not detected, the second adjustment repeats the second impedance adjustment until a previously set lower limit of line voltage is reached.

16. A non-transitory computer-readable storage medium storing computer-executable instructions that, when executed by a computer, cause the computer to perform a control method for a communication apparatus that captures a line according to an off-hook operation, the control method comprising:

performing, as a first adjustment, first impedance adjustment according to detection of the off-hook operation;

detecting a line current and a dial tone signal; and performing, as a second adjustment, second impedance adjustment based on the line current when the dial tone signal is not detected after the first impedance adjustment is performed by the first adjustment, wherein the second impedance adjustment is performed to obtain a line voltage lower than a line voltage obtained by the first impedance adjustment being performed, and wherein, during a period when the dial tone signal is not detected, the second adjustment repeats the second impedance adjustment until a previously set lower limit of line voltage is reached.

17. A control method for a communication apparatus that captures a line according to an off-hook operation, the control method comprising:

performing, as a first adjustment, first impedance adjustment according to detection of the off-hook operation;

detecting a line current and a dial tone signal; and performing, as a second adjustment, second impedance adjustment based on the line current when the dial tone signal is not detected after the first impedance adjustment is performed by the first adjustment, wherein, after performing the second impedance adjustment, the second adjustment stores a result of the second impedance adjustment and, after that and without the first impedance adjustment being performed, the second adjustment performs the second impedance adjustment based on the stored result.

18. A non-transitory computer-readable storage medium storing computer-executable instructions that, when executed by a computer, cause the computer to perform a control method for a communication apparatus that captures a line according to an off-hook operation, the control method comprising:

performing, as a first adjustment, first impedance adjustment according to detection of the off-hook operation;

detecting a line current and a dial tone signal; and performing, as a second adjustment, second impedance adjustment based on the line current when the dial tone signal is not detected after the first impedance adjustment is performed by the first adjustment, wherein, after performing the second impedance adjustment, the second adjustment stores a result of the second impedance adjustment and, after that and without the first impedance adjustment being performed, the second adjustment performs the second impedance adjustment based on the stored result.

19. The communication apparatus according to claim 3, wherein the second impedance adjustment is performed to obtain an impedance lower than an impedance obtained by the first impedance adjustment being performed.

* * * * *